US011255260B2

(12) United States Patent
Sturman

(10) Patent No.: US 11,255,260 B2
(45) Date of Patent: *Feb. 22, 2022

(54) VARIABLE COMPRESSION RATIO ENGINES AND METHODS FOR HCCI COMPRESSION IGNITION OPERATION

(71) Applicant: Sturman Digital Systems, LLC, Woodland Park, CO (US)

(72) Inventor: Oded Eddie Sturman, Woodland Park, CO (US)

(73) Assignee: Sturman Digital Systems, LLC, Woodland Park, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/790,533

(22) Filed: Feb. 13, 2020

(65) Prior Publication Data

US 2020/0256246 A1  Aug. 13, 2020

Related U.S. Application Data

(63) Continuation of application No. 15/889,546, filed on Feb. 6, 2018, now Pat. No. 10,563,573, which is a
(Continued)

(51) Int. Cl.
*F02B 75/04* (2006.01)
*F02D 41/30* (2006.01)
(Continued)

(52) U.S. Cl.
CPC ............. *F02B 75/044* (2013.01); *F01L 9/10* (2021.01); *F02B 1/12* (2013.01); *F02B 1/14* (2013.01);
(Continued)

(58) Field of Classification Search
CPC .. F02B 75/044; F02B 1/12; F02B 1/14; F02B 21/00; F01L 9/02; F02D 35/023
(Continued)

(56) References Cited

U.S. PATENT DOCUMENTS 2,442,664 A  6/1948  Roensch
2,614,546 A  10/1952  Schwarz
(Continued)

FOREIGN PATENT DOCUMENTS

DE  102009029808  10/2010
WO  WO-2012/028941  3/2012
(Continued)

OTHER PUBLICATIONS

"International Search Report and Written Opinion of the International Searching Authority dated Jun. 28, 2013; International Application No. PCT/US2013/028088", dated Jun. 28, 2013.
(Continued)

*Primary Examiner* — Lindsay M Low
*Assistant Examiner* — Omar Morales
(74) *Attorney, Agent, or Firm* — Womble Bond Dickinson (US) LLP

(57) ABSTRACT

Variable compression ratio engines and methods for homogeneous charge, compression ignition operation. The engines effectively premix the fuel and air well before compression ignition. Various embodiments are disclosed including embodiments that include two stages of compression to obtain compression ratios well above the mechanical compression ratio of the engine cylinders for compression ignition of difficult to ignite fuels, and a controllable combustion chamber volume for limiting the maximum temperature during combustion. Energy storage with energy management are also disclosed.

20 Claims, 14 Drawing Sheets

Related U.S. Application Data continuation of application No. 14/468,589, filed on Aug. 26, 2014, now Pat. No. 9,932,894, which is a continuation of application No. PCT/US2013/028088, filed on Feb. 27, 2013.

(60) Provisional application No. 61/663,996, filed on Jun. 25, 2012, provisional application No. 61/608,522, filed on Mar. 8, 2012, provisional application No. 61/603,818, filed on Feb. 27, 2012.

(51) Int. Cl.
| | | |
|---|---|---|
| *F02D 35/02* | (2006.01) | |
| *F02D 41/00* | (2006.01) | |
| *F02B 1/12* | (2006.01) | |
| *F02B 33/22* | (2006.01) | |
| *F02B 1/14* | (2006.01) | |
| *F02B 21/00* | (2006.01) | |
| *F01L 9/10* | (2021.01) | |

(52) U.S. Cl.
CPC ............ *F02B 21/00* (2013.01); *F02B 33/22* (2013.01); *F02D 35/023* (2013.01); *F02D 35/028* (2013.01); *F02D 41/0002* (2013.01); *F02D 41/3041* (2013.01); *Y02T 10/12* (2013.01); *Y02T 10/40* (2013.01)

(58) Field of Classification Search
USPC .................................................. 123/48 AA
See application file for complete search history.

(56) References Cited

U.S. PATENT DOCUMENTS

| | | | |
|---|---|---|---|
| 3,168,083 A | 2/1965 | Buchanan | |
| 3,637,332 A | 1/1972 | McAnally, III | |
| 3,964,452 A | 6/1976 | Nakamura et al. | |
| 4,572,116 A | 2/1986 | Hedelin | |
| 4,890,585 A | 1/1990 | Hathorn | |
| 5,101,776 A | 4/1992 | Ma | |
| 5,341,771 A | 8/1994 | Riley | |
| 5,460,329 A | 10/1995 | Sturman | |
| 5,638,781 A | 6/1997 | Sturman | |
| 5,713,316 A | 2/1998 | Sturman | |
| 5,720,261 A | 2/1998 | Sturman et al. | |
| 5,829,396 A | 11/1998 | Sturman | |
| 5,842,453 A | 12/1998 | Hedelin | |
| 5,954,030 A | 9/1999 | Sturman et al. | |
| 5,960,753 A | 10/1999 | Sturman | |
| 5,970,956 A | 10/1999 | Sturman | |
| 6,012,644 A | 1/2000 | Sturman et al. | |
| 6,085,991 A | 7/2000 | Sturman | |
| 6,148,778 A | 11/2000 | Sturman | |
| 6,161,770 A | 12/2000 | Sturman | |
| 6,173,685 B1 | 1/2001 | Sturman | |
| 6,257,499 B1 | 7/2001 | Sturman | |
| 6,308,690 B1 | 10/2001 | Sturman | |
| 6,360,728 B1 | 3/2002 | Sturman | |
| 6,415,749 B1 | 7/2002 | Sturman et al. | |
| 6,427,643 B1 | 8/2002 | Dixon | |
| 6,463,907 B1 | 10/2002 | Hiltner | |
| 6,557,506 B2 | 5/2003 | Sturman | |
| 6,575,126 B2 | 6/2003 | Sturman | |
| 6,675,748 B2 | 1/2004 | Ancimer et al. | |
| 6,739,293 B2 | 5/2004 | Turner et al. | |
| 6,840,211 B2 | 1/2005 | Takahashi | |
| 6,910,459 B2 | 6/2005 | Sun et al. | |
| 7,025,326 B2 | 4/2006 | Lammert et al. | |
| 7,032,574 B2 | 4/2006 | Sturman | |
| 7,108,200 B2 | 9/2006 | Sturman | |
| 7,182,068 B1 | 2/2007 | Sturman et al. | |
| 7,341,028 B2 | 3/2008 | Klose et al. | |
| 7,387,095 B2 | 6/2008 | Babbitt et al. | |
| 7,412,969 B2 | 8/2008 | Pena et al. | |
| 7,568,632 B2 | 8/2009 | Sturman | |
| 7,568,633 B2 | 8/2009 | Sturman | |
| 7,694,891 B2 | 4/2010 | Sturman | |
| 7,717,359 B2 | 5/2010 | Sturman | |
| 7,730,858 B2 | 6/2010 | Babbitt et al. | |
| 7,793,638 B2 | 9/2010 | Sturman | |
| 7,954,472 B1 * | 6/2011 | Sturman ............. | F02D 41/0087 123/299 |
| 7,958,864 B2 | 6/2011 | Sturman | |
| 8,196,844 B2 | 6/2012 | Kiss et al. | |
| 8,282,020 B2 | 10/2012 | Kiss et al. | |
| 8,327,831 B2 | 12/2012 | Sturman | |
| 8,342,153 B2 | 1/2013 | Sturman | |
| 8,366,018 B1 | 2/2013 | Giordano et al. | |
| 8,579,207 B2 | 11/2013 | Sturman | |
| 8,596,230 B2 | 12/2013 | Sturman et al. | |
| 8,628,031 B2 | 1/2014 | Kiss | |
| 8,629,745 B2 | 1/2014 | Sturman et al. | |
| 8,733,671 B2 | 5/2014 | Sturman | |
| 9,181,890 B2 | 11/2015 | Sturman | |
| 2002/0017573 A1 | 2/2002 | Sturman | |
| 2002/0023625 A1 | 2/2002 | Sturman | |
| 2002/0023626 A1 | 2/2002 | Sturman | |
| 2002/0040692 A1 | 4/2002 | LaPointe et al. | |
| 2002/0166515 A1 | 11/2002 | Ancimer et al. | |
| 2003/0015155 A1 | 1/2003 | Turner et al. | |
| 2004/0065854 A1 | 4/2004 | Lammert et al. | |
| 2004/0103874 A1 | 6/2004 | Takahashi | |
| 2004/0188537 A1 | 9/2004 | Sturman | |
| 2004/0237928 A1 | 12/2004 | Sun et al. | |
| 2004/0238657 A1 | 12/2004 | Sturman | |
| 2005/0211201 A1 | 9/2005 | Klose et al. | |
| 2005/0263116 A1 | 12/2005 | Babbitt et al. | |
| 2006/0150931 A1 | 7/2006 | Sturman | |
| 2006/0157581 A1 | 7/2006 | Kiss et al. | |
| 2006/0192028 A1 | 8/2006 | Kiss | |
| 2007/0007362 A1 | 1/2007 | Sturman | |
| 2007/0113906 A1 | 5/2007 | Sturman et al. | |
| 2007/0245982 A1 | 10/2007 | Sturman | |
| 2007/0246014 A1 | 10/2007 | Pena et al. | |
| 2008/0087738 A1 | 4/2008 | Sturman | |
| 2008/0236525 A1 | 10/2008 | Babbitt et al. | |
| 2008/0264393 A1 | 10/2008 | Sturman | |
| 2008/0277504 A1 | 11/2008 | Sturman | |
| 2009/0183699 A1 | 7/2009 | Sturman | |
| 2009/0199819 A1 | 8/2009 | Sturman | |
| 2009/0212126 A1 | 8/2009 | Sturman | |
| 2010/0012745 A1 | 1/2010 | Sturman | |
| 2010/0024750 A1 | 2/2010 | Atalla | |
| 2010/0186716 A1 | 7/2010 | Sturman | |
| 2010/0229838 A1 | 9/2010 | Sturman | |
| 2010/0263645 A1 * | 10/2010 | Scuderi ............. | F02B 33/44 123/70 R |
| 2010/0277265 A1 | 11/2010 | Sturman et al. | |
| 2011/0083643 A1 | 4/2011 | Sturman et al. | |
| 2011/0163177 A1 | 7/2011 | Kiss | |
| 2012/0031383 A1 | 2/2012 | Stockhausen | |
| 2012/0080110 A1 | 4/2012 | Kiss et al. | |
| 2013/0075498 A1 | 3/2013 | Sturman | |
| 2014/0138454 A1 | 5/2014 | Sturman | |
| 2015/0075492 A1 | 3/2015 | Glugla et al. | |
| 2015/0167576 A1 | 6/2015 | Glugla et al. | |
| 2015/0252695 A1 | 9/2015 | Bandyopadhyay et al. | |

FOREIGN PATENT DOCUMENTS

| | | |
|---|---|---|
| WO | WO-2013/022630 | 2/2013 |
| WO | WO-2016/196839 | 12/2016 |

OTHER PUBLICATIONS

"Invitation to Pay Additional Fees Dated Apr. 19, 2013; International Application No. PCT/US2013/028088", Apr. 19, 2014.
"Notice of Allowance dated Sep. 27, 2017; U.S. Appl. No. 14/468,589", filed Sep. 27, 2017.
"Office Action dated Jun. 14, 2017; U.S. Appl. No. 14/468,589", filed Jun. 14, 2017.

(56) References Cited

OTHER PUBLICATIONS

Jun, Daesu et al., "A Study of High Combustion Efficiency and Low CO Emission in a Natural Gas HCCI Engine", SAE Technical Paper Series No. 2004-01-1974, Fuels & Lubricants Meeting & Exhibition, Toulouse, France, Jun. 8-10, 2004, 13 pp. total.

* cited by examiner

VARIABLE COMPRESSION RATIO ENGINES AND METHODS FOR HCCI COMPRESSION IGNITION OPERATION

CROSS-REFERENCE TO RELATED APPLICATIONS

This application is a continuation of U.S. patent application Ser. No. 15/889,546 filed Feb. 6, 2018, which is a continuation of U.S. patent application Ser. No. 14/468,589 filed Aug. 26, 2014, which is a continuation of International Application No. PCT/US2013/028088 filed Feb. 27, 2013 which claims the benefit of U.S. Provisional Patent Application No. 61/603,818 filed Feb. 27, 2012, U.S. Provisional Patent Application No. 61/608,522 filed Mar. 8, 2012 and U.S. Provisional Patent Application No. 61/663,996 filed Jun. 25, 2012.

BACKGROUND OF THE INVENTION

1. Field of the Invention

The present invention relates to the field of compression ignition engines.

2. Prior Art

Compression ignition engines are well known in the prior art. While such engines can potentially operate on a wide range of liquid and gaseous fuels, commercially available compression ignition engines are limited to operation on diesel fuel and biodiesel fuels. Historically, diesel engines emitted substantial quantities of unburned hydrocarbons and $NO_X$. Such emission levels are no longer considered acceptable. Accordingly, recent developments have been incorporated to clean up the exhaust of diesel engines so that the same are competitive with currently available gasoline engines. However, adoption of alternate fuels for compression ignition engines has heretofore not succeeded, not because compression ignition cannot be achieved but because compression ignition is very difficult to achieve, and when achieved, the pressure and temperature spike that results raises the temperature in the combustion chamber to well above that at which $NO_X$ forms. Also, very high mechanical compression ratios (the ratio of maximum to minimum combustion chamber volume) are usually required to obtain compression ignition for other fuels, making the design of such engines difficult. In particular, high mechanical compression ratios mean that the combustion chamber volume when the piston is at top dead center must be very small, and since that volume is spread over an area at least as large as the piston, the thickness of the volume in the combustion chamber when the piston is at top dead center is small, which among other things results in substantial heat transfer from the very hot gasses in the combustion chamber to the surfaces defining that volume, and further provides a large area for a given combustion chamber volume which can thermally quench and prevent combustion of a fuel/air mixture immediately adjacent that relatively large surface area.

Two fuels that have interesting possibilities for use in combustion ignition engines are ammonia and natural gas. Ammonia is of interest because it can be manufactured from other sources of energy, particularly non-polluting sources such as wind and solar, and when burned, merely exhausts nitrogen (assuming the temperature below which $NO_X$ will form is not exceeded) and steam which merely condenses to water vapor. Thus the products of combustion of ammonia are simply nitrogen, which already makes up approximately 80% of the atmosphere, and harmless water vapor. On the other hand, natural gas, while still a hydrocarbon, is of interest primarily because of its quantity and low cost, which therefore has the potential of substantially reducing the U.S. dependence on foreign oil.

Fuels like ammonia and natural gas have a combination of problems. First, the high or very high mechanical compression ratios required to obtain ignition, and second, the tendency of the combustion to exceed the temperatures at which $NO_X$ is formed once ignition is obtained. Also, for a gaseous fuel, injection of the gas into a combustion chamber in sufficient quantities for immediate ignition at the temperatures and pressures adequate for self ignition is near impossible. Consequently for gaseous fuels, the fuel needs to be mixed with the intake air, premixed so to speak, so control of the piston position (generally crankshaft angle for all except free piston engine embodiments) for ignition is very important, generally requiring a very versatile and controllable engine. Also even for liquid fuels, better mixing of the fuel and air is achievable to reduce combustion hot spots if the fuel and air are similarly premixed.

In U.S. Pat. No. 3,964,452, a spark ignition engine is disclosed that actually has a variable mechanical compression ratio. In particular, either a separate, spring loaded piston is provided in the engine head for each combustion chamber, or the engine piston itself is spring loaded so it can deflect downward when necessary. For both embodiments, once ignition is achieved and the pressure and temperature in the combustion chamber begin to spike, the spring loaded piston deflects, actually increasing the combustion chamber volume, which limits the pressure spike and most importantly the temperature spike.

The advantages of operating a compression ignition engine as an HCCI (homogeneous charge compression ignition) engine are well known in the prior art. In accordance with such operation, fuel is pre-mixed with air, either by injection of the fuel into the combustion chamber early in the compression stroke, or mixed with air in the intake manifold. This allows time for vaporization of liquid fuel, and for thorough mixing of the air and fuel, whether a liquid fuel or a gaseous fuel is being used. Consequently, ideally on ignition, combustion is uniform without the creation of hot spots, and combustion is complete because of the absence of fuel rich locations in the combustion chamber which do not thoroughly burn. Consequently, a compression ignition engine operating in an HCCI mode is particularly clean and highly efficient. The difficulty, however, that is commonly encountered in the prior art is that the amount of fuel (fuel/air ratio) that may be effectively used is quite limited, thereby limiting the power output of a particular engine to much less than the engine potentially could produce. The problem with adding more fuel to get more power from an engine operating as an HCCI engine is that all of the fuel that will be injected into the combustion chamber is already present in the combustion chamber at the time of ignition. Thus, unless the fuel/air ratio is kept relatively low, there will be a large spike in pressure and temperature, resulting in temperatures at which nitrous oxides are formed.

One approach for addressing this problem is disclosed in U.S. Pat. No. 6,910,459 entitled "HCCI Engine with Combustion-Tailoring Chamber". In accordance with that patent, for each cylinder of the engine, an auxiliary combustion chamber and an inlet passage between the main combustion chamber and the auxiliary combustion chamber are formed in the engine head, with a control valve controlling communication between the main combustion chamber and the auxiliary chamber. Two embodiments are actually disclosed, though both use a conventional inlet (intake) valve operating system so that the inlet valve is driven between open and closed positions in a fixed relationship with the rotation of the crankshaft. Both embodiments also use a single auxiliary combustion chamber. The control valve, on the other hand, is electro-hydraulically controlled so as to allow variable timing with respect to crankshaft rotation.

DETAILED DESCRIPTION OF THE PREFERRED EMBODIMENTS

The present application is based on the disclosures of three separate provisional applications. The disclosure of the first provisional application is substantially repeated below.

Figure 1:
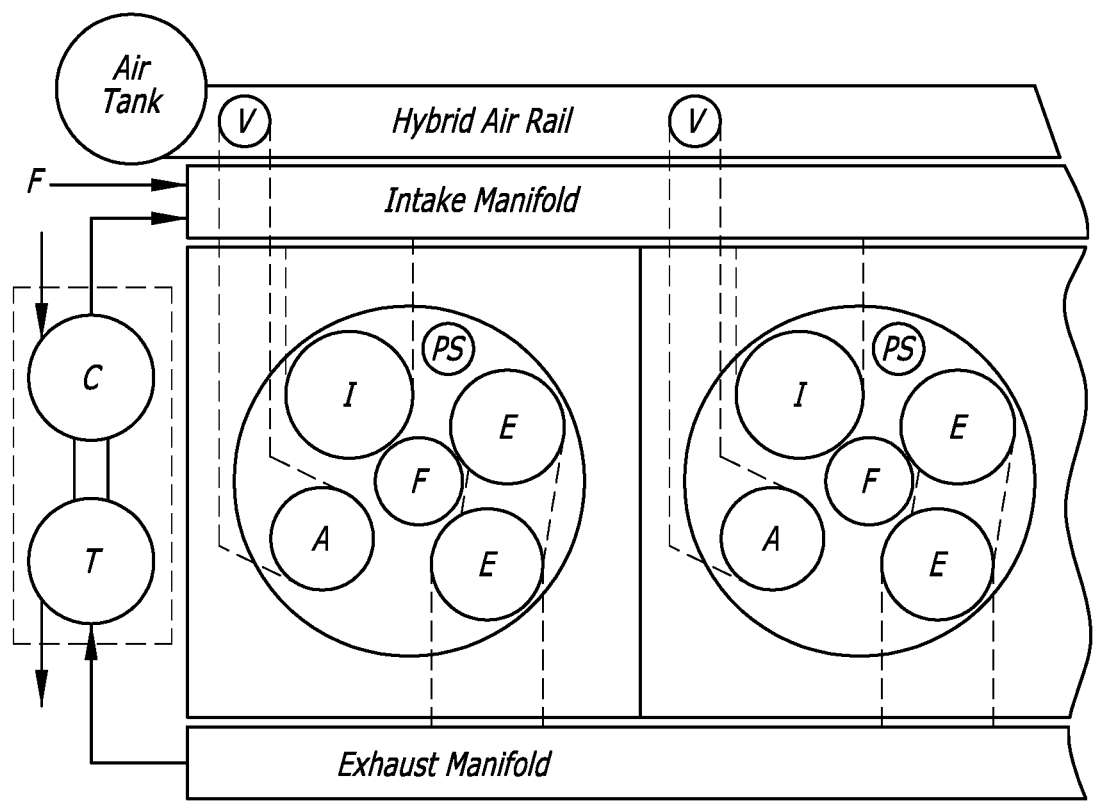
FIG. 1 illustrates an engine head arrangement of two cylinders of a multi-cylinder engine which may be used with embodiments of the present invention.

First referring to FIG. 1, an engine head and manifolding arrangement of two cylinders of a multi-cylinder engine which may used with the present invention may be seen. Each cylinder has an intake valve I coupled to the associated intake manifold, a pair of exhaust valves E coupled to the associated exhaust manifold, a fourth valve A coupled to a hybrid air rail, which in turn is coupled to an air tank, a fuel injector F and a pressure sensor PS. Thus in this exemplary engine, each cylinder is the same, though that is not essential to this embodiment.

In the preferred embodiment, each cylinder may undertake different operations at different times, though again this too is not a limitation of the invention. The intake valve I, the exhaust valves E and the air valve A are preferably hydraulically actuated through electronic control, as is known in the art, though any control system which allows freedom in the timing of the operation of the valves could be used. Similarly, the fuel injector is electronically controllable in its timing and in the amount of fuel injected in each injection event. The fuel injector could be a gaseous fuel injector for natural gas or other gaseous fuel, or a liquid fuel injector for fuel such as ammonia. Further, fuels such as gaseous fuels and easily vaporized fuels F may be provided to the engine through the intake manifold. Some fuels such as ammonia could be used either way. Therefore using both a liquid fuel injector for injection directly into the combustion chamber together with a capability to introduce fuel into the intake manifold, the engine may be operated on substantially any liquid or gaseous fuel, and in fact many fuels may be "injected" into either the intake system or directly into the combustion chamber. Also shown in FIG. 1 is a supercharger CT driven by the exhaust to increase the pressure and temperature in the intake manifold.

Figure 2:
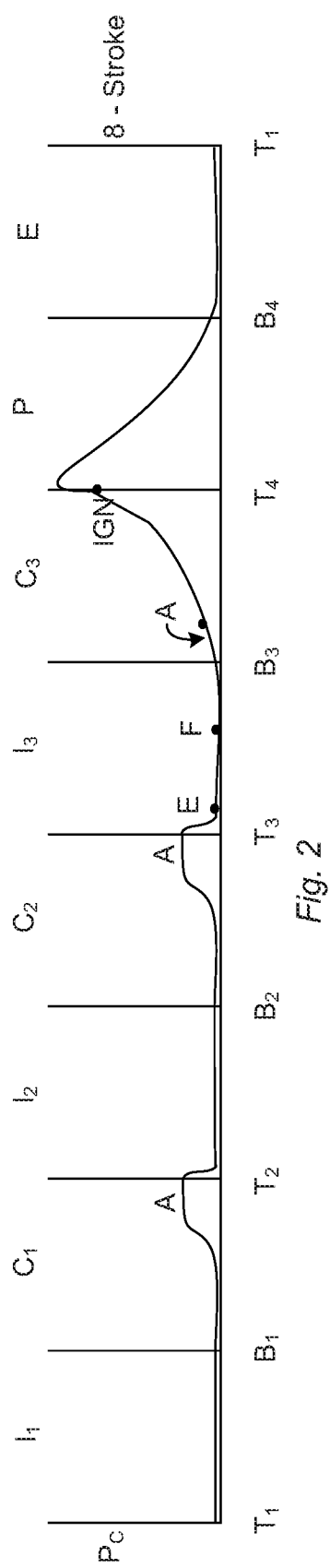
FIG. 2 illustrates an exemplary operating cycle of the present invention for a compression ignition engine in accordance with an engine of the type shown in FIG. 1.

Now referring to FIG. 2, an exemplary operating cycle for a compression ignition engine in accordance with an engine of the type shown in FIG. 1, or more generally an engine in accordance with this embodiment of the present invention, may be seen. As shown therein, the horizontal axis is, in effect, the time axis, with the vertical axis being the pressure in the combustion chamber $P_C$. The piston position is shown by the letters T and B, T representing the top dead center position of the piston and B representing the bottom dead center position of the piston. It should be noted that this Figure is highly schematic in that the pressure trace is only suggestive of the pressure in a real operating engine in accordance with the present invention. Also the engine valve operation is not shown in FIG. 2, though will be described with respect to the following description of FIG. 2.

Now referring to FIG. 2, the exhaust valves E are closed at or near the top dead center position $T_1$ and the intake valve I is opened so that between the top dead center position $T_1$ and the bottom dead center position $B_1$, a conventional intake stroke is executed. Then at the bottom dead center position $B_1$ the intake valve I is closed and piston motion toward the top dead center position $T_2$ starts to compress the air in the cylinder. At a pressure which is a fraction of the maximum cylinder pressure that could be achieved, the air valve A opens to discharge the air into the hybrid air rail. The opening of the air valve A may be electronically controlled, either open loop, or by sensing the appropriate pressure by pressure sensor PS (FIG. 1) or some other pressure sensor (not shown). Alternatively the air valve A may simply be a one-way valve which opens and closes by way of a differential pressure across the valve. In any event, at the top dead center position $T_2$ the air valve A will close, after which the pressure in the combustion chamber will fall quickly because most of the air in the cylinder has been already exhausted to the hybrid air rail, after which the intake valve I will open again to carry out a second intake stroke followed by a second compression stroke.

At the top dead center position $T_3$ the air valve A will again close, and after the pressure in the combustion cylinder quickly falls to or near the pressure in the intake manifold (which may be supercharged if desired), one or more of the exhaust valves E may be opened momentarily to bring back some exhaust gas remaining from the prior operating cycle, with fuel F then being introduced (injected) into the combustion chamber. Finally, at the bottom dead center position $B_3$ the intake valve I is closed and the air valve A is opened for that cylinder to bring in additional intake air from the hybrid air rail, after which the air valve A is closed. Because the air compressed during the compression strokes $C_1$ and $C_2$ causes a significant rise in the air temperature, the temperature in the combustion cylinder after introducing that air from the hybrid air rail will be substantially higher than is achieved through a normal intake stroke followed by an equivalent partial compression stroke. Note that this is achieved before any substantial further compression is achieved during the compression stroke $C_3$ so that most of the mechanical compression ratio during compression stroke $C_3$ is effectively maintained on the charge in the combustion chamber, though such compression starts at a substantially higher pressure and temperature than if only a normal intake stroke had been executed. Consequently one can obtain ignition of fuels such as ammonia and natural gas substantially at $T_4$, though in an engine having a mechanical compression ratio that is much lower than would be required to obtain such compression ignition, and using an amount of fuel for maximum power that is less than that which will cause the temperature in the combustion chamber to rise enough to create $NO_X$. In that regard, the maximum amount of fuel per combustion cycle may be approximately equal to what would be a stoichiometric amount that would be used in a very high compression engine using a single compression stroke to ignition. However note that ignition has been achieved with such fuels in a much lower mechanical compression ratio. The extra air in the lower mechanical compression ratio combustion chamber provides not only the higher temperature needed for ignition, but also provides excess air and exhaust that does not participate in the combustion process, but which acts as a bounce volume, so to speak, much like the mechanical provision in U.S. Pat. No. 3,964,452. In essence, in accordance with the present invention, an engine of a first mechanical compression ratio may be caused to operate as if it had a second compression ratio much higher than the first compression ratio. This eliminates the mechanical difficulties in achieving a mechanical compression ratio of 40 to 1 or higher, and of also achieving a variable mechanical compression ratio like in U.S. Pat. No. 3,964,452, but still allows achieving combustion ignition in a reliable manner by simply synthesizing a high mechanical compression engine using a much lower mechanical compression ratio engine.

Referring again to FIG. 2, it should be noted that the introduction of fuel during the intake stroke $I_3$ is preferred, as that is the most convenient part of the operating cycle of the engine for introduction of fuels, particularly gaseous fuels. However in the case of a liquid fuel, such fuel could be introduced (injected) at any time prior to ignition, though in the preferred embodiment it is preferable to inject even a liquid fuel either during the intake stroke $I_3$ or very early in the compression stroke $C_3$ to provide maximum opportunity for the fuel to vaporize and thoroughly mix with the available air. In that regard, even a gaseous fuel could be introduced later in the cycle, though introduction during the intake stroke $I_3$ is preferred.

The foregoing description describes the cycle of FIG. 2 which is an 8-stroke cycle. Obviously, more or fewer pure compression strokes may be used as appropriate to achieve the desired ignition temperature at the desired ignition point. Also, because of the electronic control of the fuel injector and engine valves, engine valve operation may be delayed or advanced as desired to maintain the ignition point at or near the top dead center position. For this purpose, sensor PS may easily detect ignition, with cycle to cycle adjustments being made in the engine valve and control system to maintain ignition at the desired point. In essence, the degree of engine control available allows operation of the engine as a variable compression ratio engine. In that regard, preferably the engine valve control is achieved through an electronically controlled, hydraulically operated engine valve actuation system for full freedom in at least valve actuation timing as desired. Examples of such hydraulic valve actuation systems are set forth later herein.

In the foregoing description, two compression cycles are used for one four stroke combustion cycle. Note however that this is not a limitation of the invention. By way of example, a single compression cycle may used for each combustion cycle such as would be effectively obtained in a six cylinder engine by using four cylinders as combustion cylinders and two cylinders for compression cylinders. Alternatively, three (or more) compression cycles may be used for each combustion cycle. Further, the combustion cylinder may be operated in a two stroke cycle if desired. All of these variations may be used in a single engine at different times and/or for different fuels by simply applying the appropriate engine control, as it is not the engine physical characteristics that allow any one of these operating modes, but rather it is the control coupled with the flexibility of the engine operation that allows this variation, In general, the self ignition of a fuel/air mixture is almost entirely temperature dependent and has very little, if any, pressure dependence. Thus a key point determining the time of ignition is the combination of the temperature in the combustion chamber at the beginning of compression of the charge, coupled with the remaining mechanical compression ratio that will act on that charge. As such, another way of achieving the desired ignition temperature at the proper time would be to heat the air from the hybrid air rail so that the compression stroke $C_3$ begins with a hotter charge. This, too, will provide the desired temperature for ignition at the proper piston position if the air is introduced at the right temperature. Accordingly, by heating the air prior to its compression during compression stroke $C_3$, the intake stroke $I_1$ and compression stroke $C_1$, or both sets of intake and compression strokes $I_1$, $C_1$ and $I_2$, $C_2$ might be dispensed with. Alternatively, one or more compression strokes like $C_1$ and $C_2$ may be used, then the air in hybrid air rail heated and used as part or all of the air for the intake cycle. The limit, however, is that the amount of fuel injected must be limited to avoid the temperature spike that would form $NO_X$ during combustion. Accordingly such operation may well only be suitable for low engine loads or for idling conditions.

In comparison to trying to adapt U.S. Pat. No. 3,964,452 previously mentioned to such alternate fuels, this embodiment does not limit combustion chamber temperatures by limiting combustion chamber pressures by varying the combustion chamber volume by mechanical means after ignition, but rather by simply using a larger combustion chamber to start with. Thus the present invention is not as mechanically complex as any adaption of U.S. Pat. No. 3,964,452, and is much more suitable for incorporating into new engines without redesign of the engine block, and for the same reason may also be suitable for retrofit of existing engines.

Figure 3:
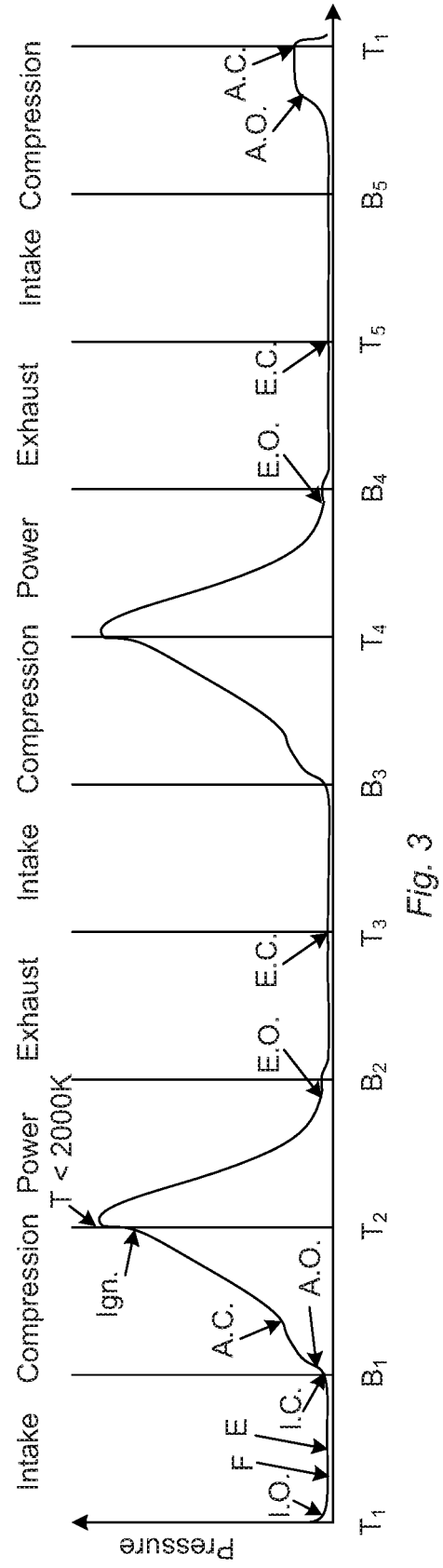
FIG. 3 illustrates a further exemplary operating cycle of the present invention for a compression ignition engine in accordance with an engine of the type shown in FIG. 1.

Now referring to FIG. 3, another exemplary operating cycle for the present invention may be seen. This operating cycle is a 10-stroke cycle having two power strokes and a single compression stroke for providing air to the hybrid air rail. Referring specifically to FIG. 3, the top dead center engine piston position $T_1$ is the end of a compression stroke which may be seen at the right end of the Figure. Because most of the air that was in the combustion chamber was delivered to the hybrid air rail and the air valve A is closed, the pressure will quickly drop in the combustion chamber as the piston moves away from the top dead center position $T_1$. When the pressure in the combustion chamber falls to approximately the pressure in the intake manifold, the intake valves I open, followed by the injection of fuel by injector F and then the opening and closing of the exhaust valve E to introduce some of the hot exhaust in the exhaust manifold back into the combustion chamber. Then approximately at the bottom dead center position $B_1$ the intake valves I close and the air valve A opens for a short period and closes when the combustion chamber pressure substantially reaches the pressure of the air in the hybrid air rail. Now the combustion chamber contains fuel and an exhaust gas/air mixture, which is at a substantially higher pressure and a substantially higher temperature than if a conventional intake stroke had been executed. Accordingly once the air valve A is closed, the hot intake mixture in the combustion chamber is compressed until ignition is achieved at or near top dead center position $T_2$. Note that the peak temperature obtained in the combustion chamber may be controlled by control of the amount of fuel injected, with the exhaust gas drawn into the combustion chamber during the intake stroke providing much of the required initial temperature for compression prior to the power stroke, still with the amount of air in the combustion chamber being more than adequate for complete combustion of the fuel.

Between the top dead center position $T_2$ and the bottom dead center position $B_2$ a conventional power stroke is executed, followed by the opening of the exhaust valve E for a conventional exhaust stroke between the bottom dead center position $B_2$ and the top dead center position $T_3$. Then between the top dead center position $T_3$ and the bottom dead center position $B_3$ the same valve operation as was described with respect to the intake stroke between the top dead center position $T_1$ and the bottom dead center position $B_1$ is executed. Similarly, between the bottom dead center position $B_3$ and the top dead center position $T_4$ the same operation occurs as occurred between the bottom dead center position $B_1$ and the top dead center position $T_2$, followed by ignition and a power stroke between the top dead center position $T_4$ and the bottom dead center position $B_4$. This is followed by an exhaust stroke between the bottom dead center position $B_4$ and the top dead center position $T_5$, after which the exhaust valve E is closed and the intake valves I are opened. Then at the end of the intake stroke at bottom dead center position $B_5$, the intake valves I are closed and a compression stroke is executed with the air valve A being opened at an appropriate time to discharge the air from the cylinder into the hybrid air rail. Then at the end of this compression stroke the entire cycle may be repeated at time $T_1$.

The operation described achieves the desired temperature for ignition through the combination of the use of the supercharger CT shown in FIG. 1, together with the heat of compression of the compressed air being injected from the hybrid air rail, which can be augmented if needed by heating the pressurized air in the hybrid air rail before injection. The exhaust gas which is taken in during the intake stroke may also heat the charge to achieve ignition as desired without any need to heat the air being injected from the hybrid air rail, with that exhaust gas in the combustion chamber merely acting to fill the combustion chamber volume without contributing to the combustion other than its initial temperature so that the temperature after ignition remains below the desired temperature, such as 2000 or 2200° K.

Figure 4:
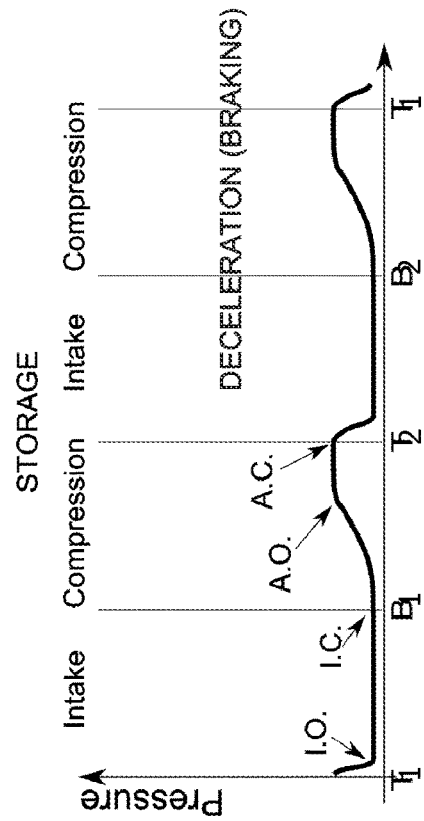
FIG. 4 illustrates a still further exemplary operating cycle of the present invention for a compression ignition engine in accordance with an engine of the type shown in FIG. 1 for providing engine braking.

Now referring to FIG. 4, a diagram illustrating a possible operating cycle for an engine decelerating, such as an engine in a vehicle in which engine braking is being used, may be seen. Here each intake and compression stroke pair is used to provide air under pressure to the air tank of FIG. 1 to increase the pressure in the air tank to the pressure capabilities of the air tank. This achieves not only increased drag by the engine, but also stores energy in the air tank for later use. Assuming for the moment that the pressure in the air tank will then exceed the normal pressure under operating conditions such as in the cycles of FIGS. 2 and 3, the increased pressure may be accounted for by decreasing the time duration that the air valve is open. The stored air may also be used in place of any compression cycles for a small period of time so that during that time the engine may be operated in a 4-stroke cycle for an increased burst of power. To the extent that even greater engine braking is needed or desired, the engine valves may be controlled to operate the engine in a cycle like the Jake Brake® wherein the engine is operated in a 2-stroke cycle with the exhaust valve being opened at top dead center so that all of the energy of compression is dissipated, ready for the following cycle intake and compression stroke.

Figure 5:
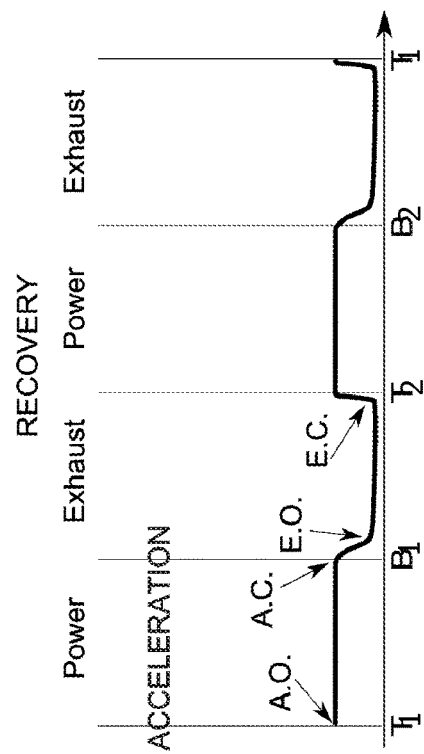
FIG. 5 illustrates a further exemplary operating cycle of the present invention for a compression ignition engine in accordance with an engine of the type shown in FIG. 1 for recovering energy from the air in the hybrid air tank.

Now referring to FIG. 5, 2-stroke cycles for operating an engine on the stored air alone may be seen. Here the hybrid air valve A is opened when the engine piston is at top dead center and closed at bottom dead center, at which point the exhaust valve is opened, and finally closed at the next top dead center position $T_2$. Again the air valve A is opened and a further power stroke is executed simply using the pressure of the air from the air tank to provide the pressure in the combustion chamber to operate the engine. Again the length of time an engine may be operated this way and the power that can be achieved will depend on the size of the air tank and the maximum pressure of the air tank. Such operation, however, could under various circumstances be of benefit. By way of example, a vehicle may use the engine braking of FIG. 4 when on a down slope and the recovery of FIG. 5 in a flat region of limited length, which is then followed by another down slope.

The present invention allows use of fuels such as natural gas and ammonia, in part because of the unique operating cycles that may be applied to the engine and further because of the total flexibility of the engine in terms of operation of its various facilities under complete control by an electronic controller. These facilities normally would include engine valves and fuel injectors, as previously mentioned, in terms of timing and manner of operation, but also would likely or possibly include other operations such as perhaps the supercharger and/or supercharger baffles and the amount, if any, of the heating of the air from the air tank before injection, etc. It is the total control of at least the most influential aspects of an engine which makes the present invention possible. Also the ability to operate the engine on either liquid or gaseous fuels provides great versatility in the engine, and in fact for fuels such as ammonia and natural gas where ignition is difficult, the engine might be started on one fuel such as diesel fuel and then changed to another fuel such as natural gas or gaseous ammonia when the engine temperature allows. Also the engine might be operated on an inexpensive but low energy per unit volume fuel such as natural gas, but switched to a higher energy fuel for greater vehicle range if and when needed, such as diesel fuel.

One final point to consider is that this and other embodiments may be combined with a GPS input to the controller, together with a database either in the vehicle in which the engine is used or at least available for update wirelessly. Through the use of the GPS input, together with the elevation versus position in the database, this allows the system to look ahead, so to speak, well beyond what is visible to the vehicle driver. By way of example, in a hilly area a driver may not know whether there is a substantial downgrade or upgrade around the next curve, and accordingly, would not know whether to store as much compressed air as possible from the last downgrade or to use that air on the present level road prior to encountering the next downgrade or the upgrade. Further, depending on the operator of the vehicle to make such decisions and to control the air into and out of the air tank and further to control the engine operation would be a tiring diversion which an individual may not be able to efficiently perform. Accordingly, a GPS input of current position, together with a database of altitude versus position, can allow the main control system for the engine to make such decisions in a most efficient and prompt manner.

The disclosure of the second provisional application is substantially repeated below.

This embodiment uses flexible intake and exhaust valves (such as hydraulically actuated engine valves with electronic control) to achieve HCCI combustion over 100% of the load with any fuel. This approach is applicable to new and existing engines for any application. The basic approach is to adjust the geometrical compression ratio (typically by control of the intake valves) to a minimum level that is still sufficient to ignite a full charge (air and fuel mixture) sufficient to achieve a full load. This will provide sufficient volume at the end of the compression stroke to avoid an explosion while providing optimum combustion. For example, for natural gas, ignition will occur at 1072° K. By keeping the peak temperature below 2200° K, no $NO_X$ emissions will be formed.

When less than full load is required, the ideal air/fuel ratio will be pre-mixed and compressed. There are several methods available to achieve the ignition temperature (for the given example of natural gas 1072° K):

1) Disabling a certain number of cylinders so that remaining cylinders remain operating at full load.

2) Opening the exhaust valves during the intake stroke in such a way that the mixture of air, fuel and exhaust will reach the ignition temperature at the desired position.

3) Controlling the intake valve timing.

Ideally the process could be controlled in a closed loop system by providing a pressure sensor in each cylinder and a microprocessor with proper software to fully optimize the operation of the system under any condition.

The disclosure of the third provisional application is substantially repeated below.

Figure 6:
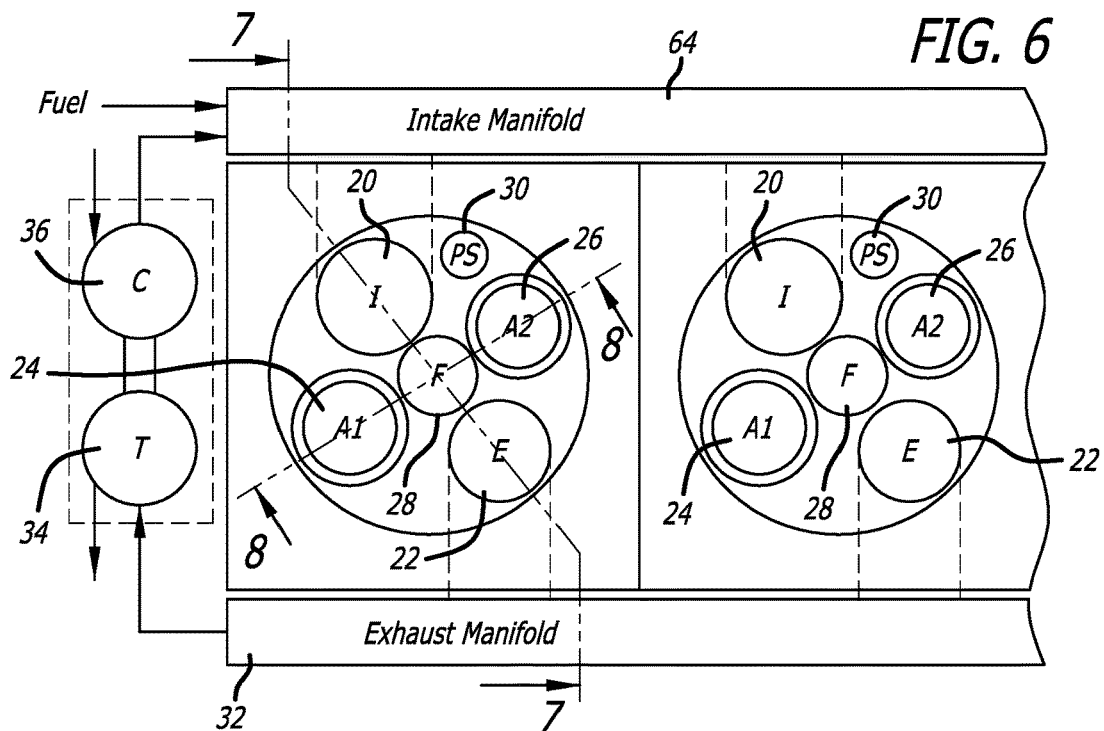
FIG. 6 schematically illustrates an exemplary engine head in accordance with one embodiment of the present invention.

Now referring to FIG. 6, an exemplary engine head in accordance with one embodiment of the present invention is schematically shown. Each cylinder includes a conventional intake valve 20, a conventional exhaust valve 22, and additional air valves 24 and 26. Also shown are a fuel injector 28 and a pressure sensor 30. A turbocharger comprising an exhaust driven turbine 34 connected to the exhaust manifold 32 driving compressor 36 provides an elevated pressure in the intake manifold 64. In that regard, fuel such as a gaseous fuel may be mixed with air in the intake manifold 64 as is well known in the art or in the cylinder during the intake stroke, or alternatively or in addition, a liquid fuel may be injected directly into the combustion chamber 38 (FIG. 7), though as shall be subsequently explained in detail, any such injection of a liquid fuel would occur early in the compression stroke or even during the intake stroke to provide both full vaporization of the liquid fuel because of the temperatures in the combustion chamber 38, particularly because of the compression to take place therein, and also to fully mix with the air in the combustion chamber 38.

Figure 7:
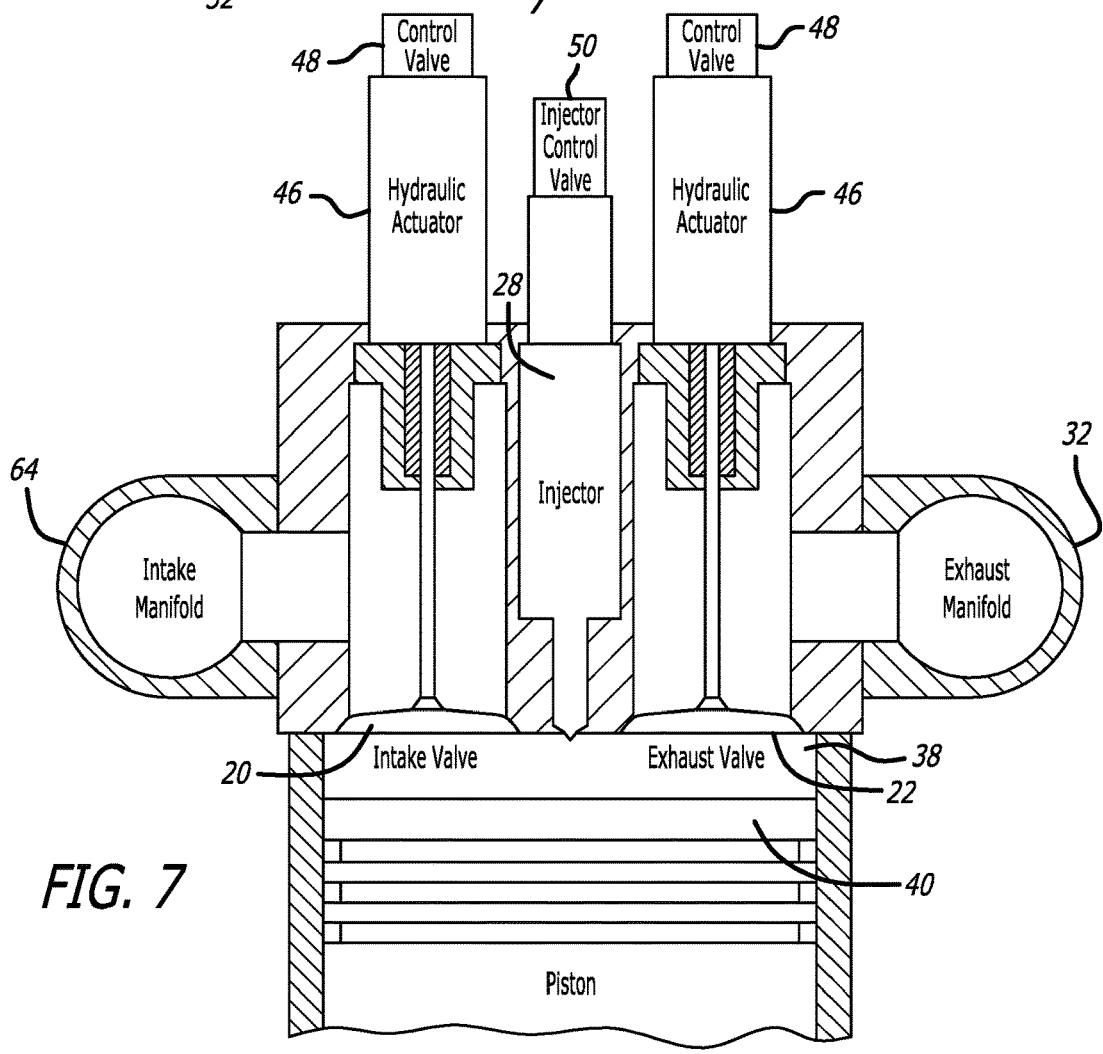
FIG. 7 is a schematic cross section taken along line 7-7 of FIG. 6.

Now referring to FIG. 7, a schematic cross section taken along line 7-7 of FIG. 6 may be seen. This is a schematic cross section taken through the intake valve 20, the fuel injector 28 and the exhaust valve 22. As may be seen therein, this schematic cross section is in general representative of such a cross section in substantially any overhead valve compression ignition engine currently in use.

Figure 8:
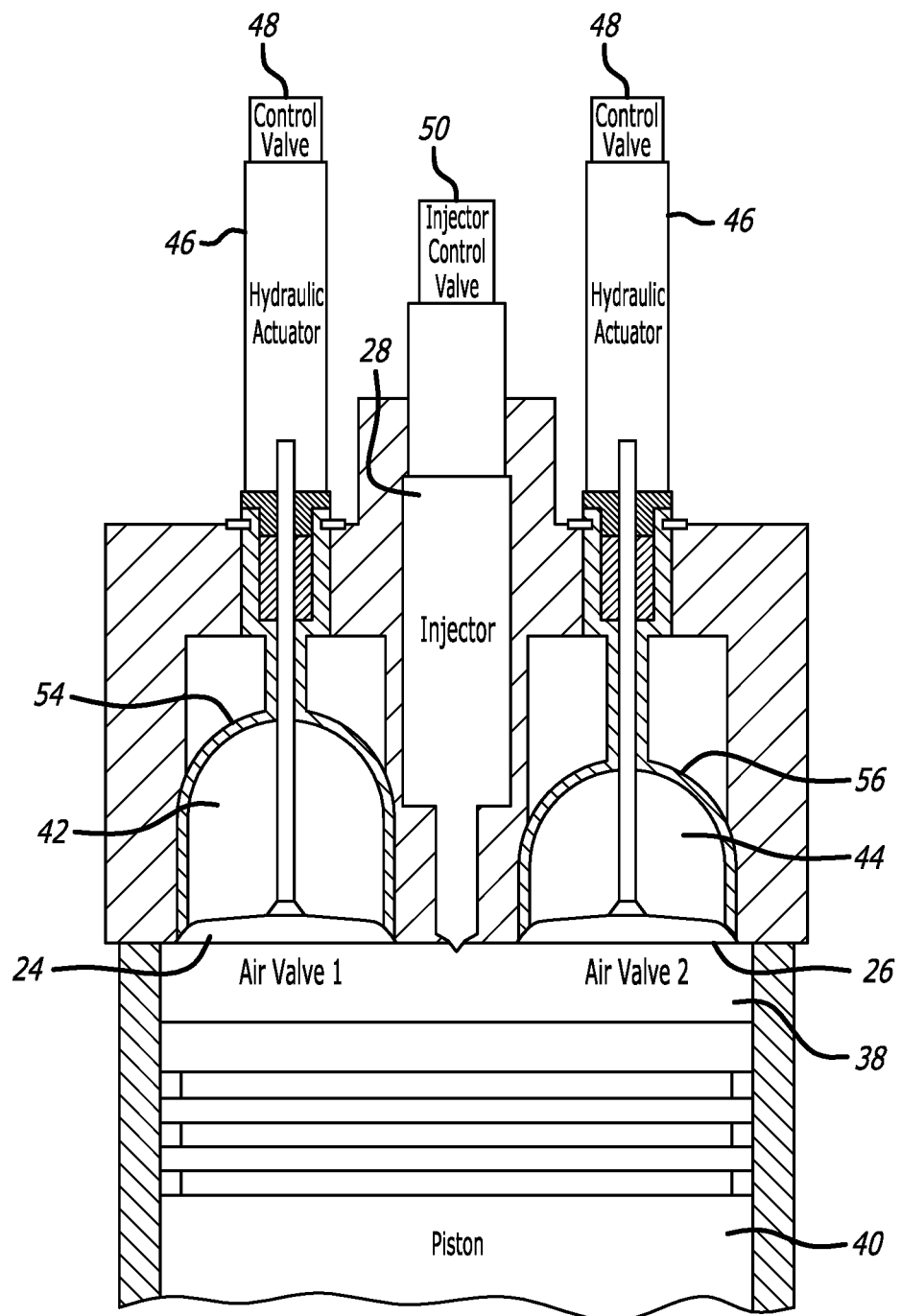
FIG. 8 is a schematic cross section taken along line 8-8 of FIG. 6.
Figure 14:
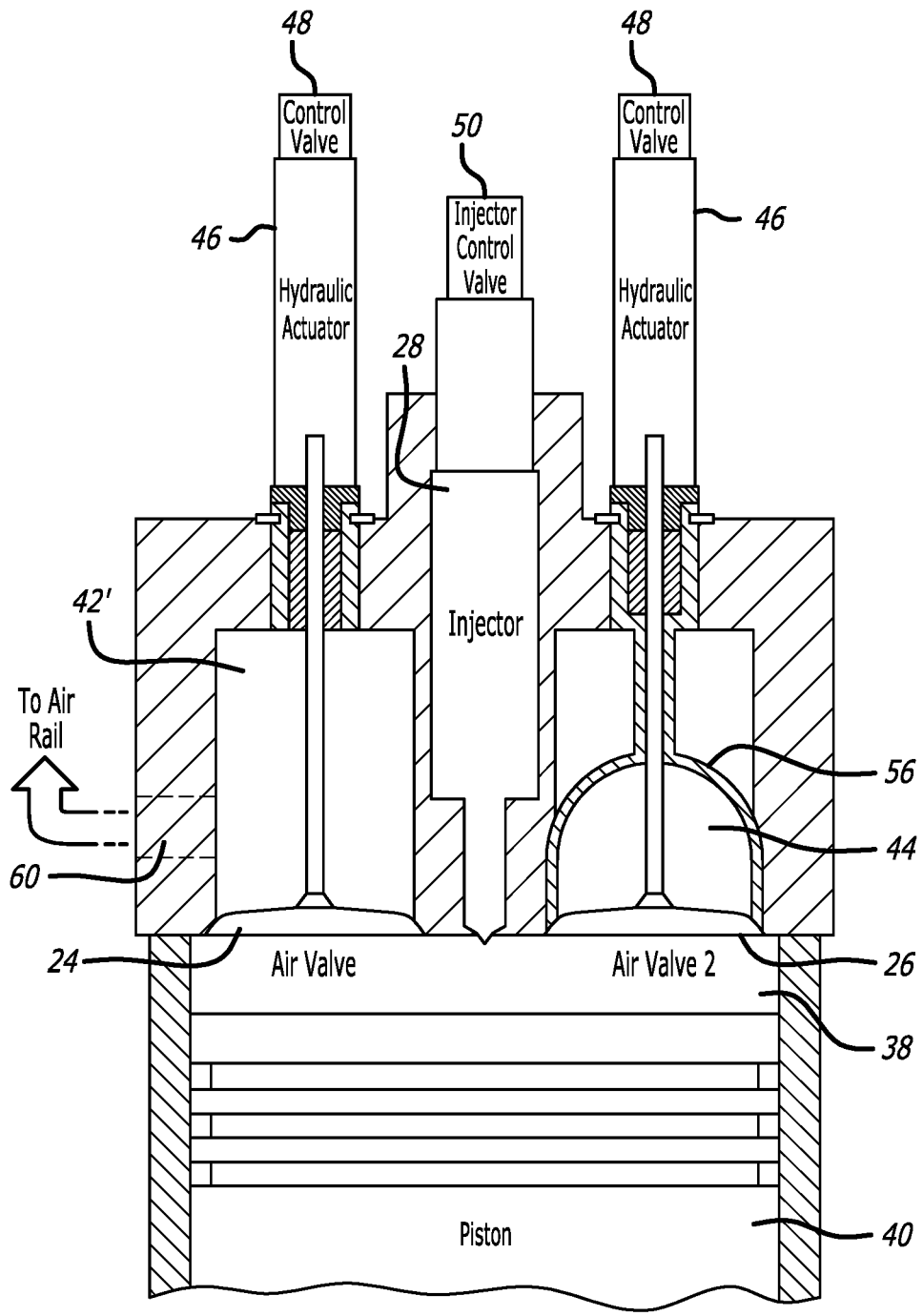
FIG. 14 is a schematic cross section taken along line 14-14 of FIG. 13.

FIG. 8 is a schematic cross section taken along line 8-8 of FIG. 6. This Figure schematically shows the cross section through the air valve 24, the fuel injector 28 and the air valve 26. Air valve 24 controls the coupling between the main combustion chamber 38 above piston 40 and a first secondary volume 42. Air valve 26, on the other hand, controls the coupling between the main combustion chamber 38 above the piston 40 and a second secondary volume 44. Both of these volumes as well as volume 44 in FIG. 14 are dead volumes in the sense that they do not lead anywhere, as opposed to a conventional engine valve that normally leads to a manifold. In a preferred embodiment, the volume of the second secondary volume 44 is less than the volume of the first secondary volume 42, though that is not a limitation of the invention. As may be seen in the Figure, air valves 24 and 26, like the intake and exhaust valves 20 and 22 of FIG. 7, are controlled by hydraulic actuator/valve spring assemblies 46, which in turn are controlled by control valves 48 on top of the actuator 46. Similarly, the injector 28 is controlled by an injector control valve 50 on the top thereof, with the control valves 48 and 50 being electromagnetically actuated control valves which also may be actuated at any time, independent of the crankshaft position.

The liquid fuel injectors of this and the other embodiments may be intensifier type fuel injectors electronically controlled through spool valves of the general type disclosed in one or more of U.S. Pat. Nos. 5,460,329, 5,720,261, 5,829,396, 5,954,030, 6,012,644, 6,085,991, 6,161,770, 6,257,499, 7,032,574, 7,108,200, 7,182,068, 7,412,969, 7,568,632, 7,568,633, 7,694,891, 7,717,359, 8,196,844, 8,282,020, 8,342,153 and 8,366,018, and U.S. Patent Application Publication Nos. 2002/0017573, 2006/0192028, 2007/0007362, 2010/0012745, 2010/0186716 and 2011/0163177. These patents and patent applications disclose electronically controllable intensifier type fuel injectors having various configurations, and include direct needle control, variable intensification ratio, intensified fuel storage and various other features.

The electronically controllable valve actuation system of this and all the other embodiments may be a hydraulic valve actuation system controlled by spool valves of the general type disclosed in one or more of U.S. Pat. Nos. 5,638,781, 5,713,316, 5,960,753, 5,970,956, 6,148,778, 6,173,685, 6,308,690, 6,360,728, 6,415,749, 6,557,506, 6,575,126, 6,739,293, 7,025,326, 7,032,574, 7,182,068, 7,341,028, 7,387,095, 7,568,633 7,730,858 and 8,342,153, and U.S. Patent Application Publication Nos. 2007/0113906 and 2010/0277265. These patents and patent applications disclose hydraulic valve actuation systems primarily intended for engine valves such as but not limited to intake and exhaust valves, and include, among other things, methods and apparatus for control of engine valve acceleration and deceleration at the limits of engine valve travel as well as variable valve lift.

Figure 9:
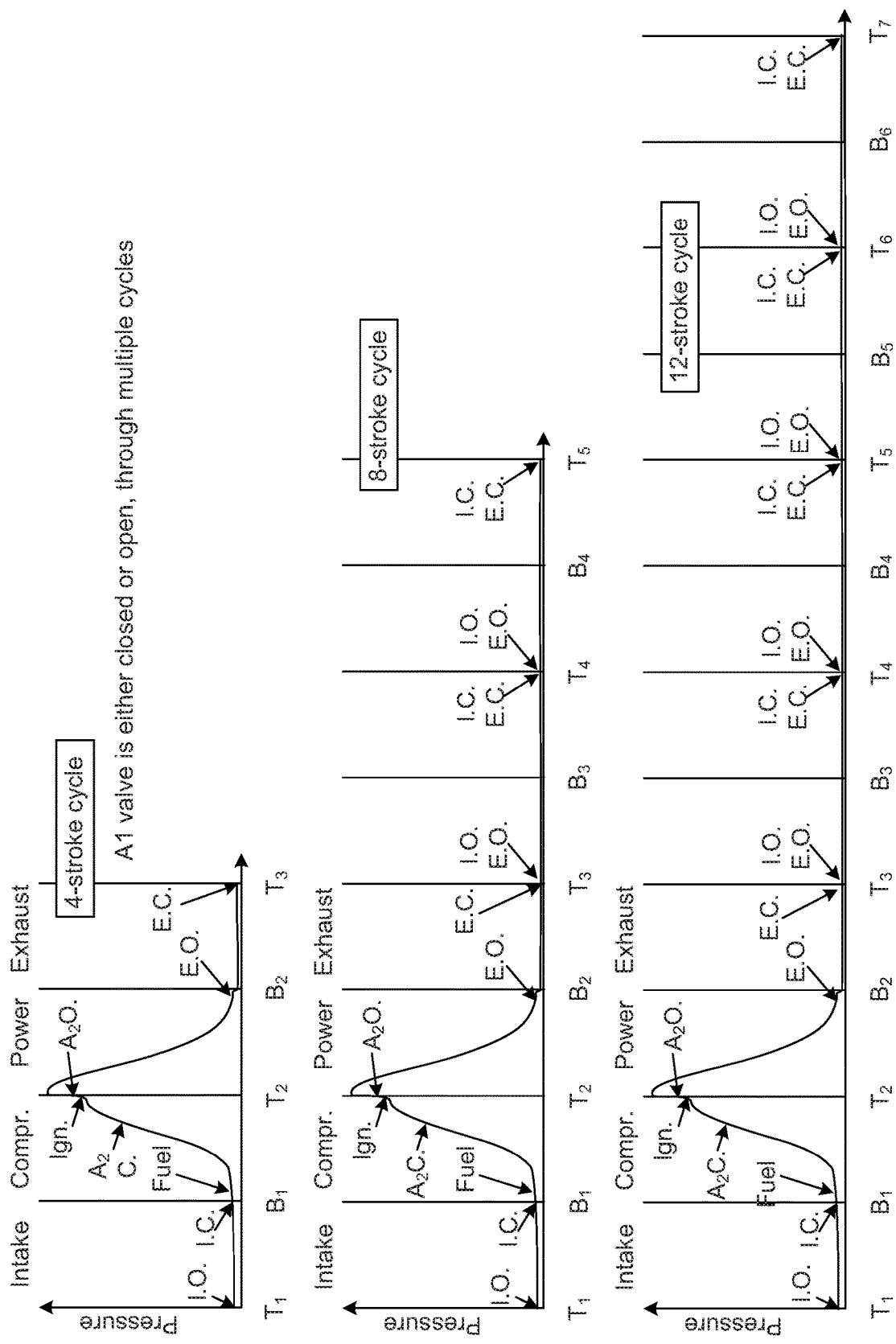
FIG. 9 illustrates three operating cycles for the present invention.

Now referring to FIG. 9, three operating cycles for the present invention may be seen. The first operating cycle illustrated is a 4-stroke operating cycle. In FIG. 9, the four strokes are labeled intake, compression (Compr.), power, and exhaust, and schematically illustrate the pressure in the combustion chamber 38 as the piston 40 moves from the top dead center position (T) to the bottom dead center position (B), and vice versa, with the numerals following T and B indicating the number of that type of stroke for the cycle being described. Starting at the beginning of the intake stroke (top dead center position T1), the air valve 26 ($A_2O$.) and intake valve 20 are open (I.O.), and during the intake stroke, if a gaseous fuel is being used, a fuel/air mixture is drawn or forced into the combustion chamber 38 by the compressor 36. If a liquid fuel is being used, then merely air is drawn or forced into the combustion chamber 38. At the bottom dead center position B1, the intake valve 20 is closed (I.C.), and alternatively, if a liquid fuel is being used, the fuel is preferably injected shortly after the intake valve 20 is closed (in some cases both a liquid and a gaseous fuel might be used). During this time the air valve 26 is open and remains open during a substantial portion of the compression stroke.

At some point in the compression cycle, air valve 26 is closed ($A_2C$.), with ignition (Ign) occurring at or near the top dead center position T2. The pressure sensor 30 senses the increasing pressure in the combustion chamber, and before the pressure and temperature can peak, air valve 26 is opened ($A_2O$.). The opening of air valve 26 after ignition couples volume 44 to the then existing volume of combustion chamber 38 so that the pressure and temperature spike is limited because of that increase in volume and the lower pressure in that volume. In that regard, the volume 44 will already be at a substantial pressure because of the air valve 26 being closed well into the compression cycle, and in addition will contain some fuel/air mixture which will be consumed when air valve 26 opens and the mixture is ignited from the combustion occurring in the main combustion chamber 38. Still, the opening of air valve 26 after ignition occurs will limit the pressure and temperature spike obtained for various reasons, including the fact that the pressure in volume 44 when air valve 26 is closed will be substantially less than when the air valve 26 is opened again near the top dead center position T2.

During the power stroke, the piston 40 will move between the top dead center position T2 and the bottom dead center position B2, with the exhaust valve 22 being opened (E.O.) at or near the bottom dead center position B2, after which the exhaust valve 22 is opened and a conventional exhaust stroke is executed between the bottom dead center position B2 and the top dead center position T3, which is effectively the top dead center position T1 of the next cycle.

Also illustrated in FIG. 9 are 8-stroke and 12-stroke cycles. These are in essence the 4-stroke cycle followed by four or eight dead or inactive strokes. In the embodiment shown in FIG. 9, after the exhaust stroke between the bottom dead center position B2 and the top dead center position T3, the exhaust valve 22 is left open and the intake valve 20 is also opened throughout these additional strokes so that no significant pressure or pressure fluctuations exist in the combustion chamber 38 until at the top dead center positions T5 and T7 for the 8-stroke and 12-stroke cycles, respectively, at which T5 and T7 positions become the T1 positions for a repeat of the 8-stroke and 12-stroke cycles. Of course, during these additional strokes no fuel is injected into the combustion chamber 38 by the fuel injector 28 nor is any fuel injected into the intake manifold 64 if a gaseous fuel is being used.

Figure 10:
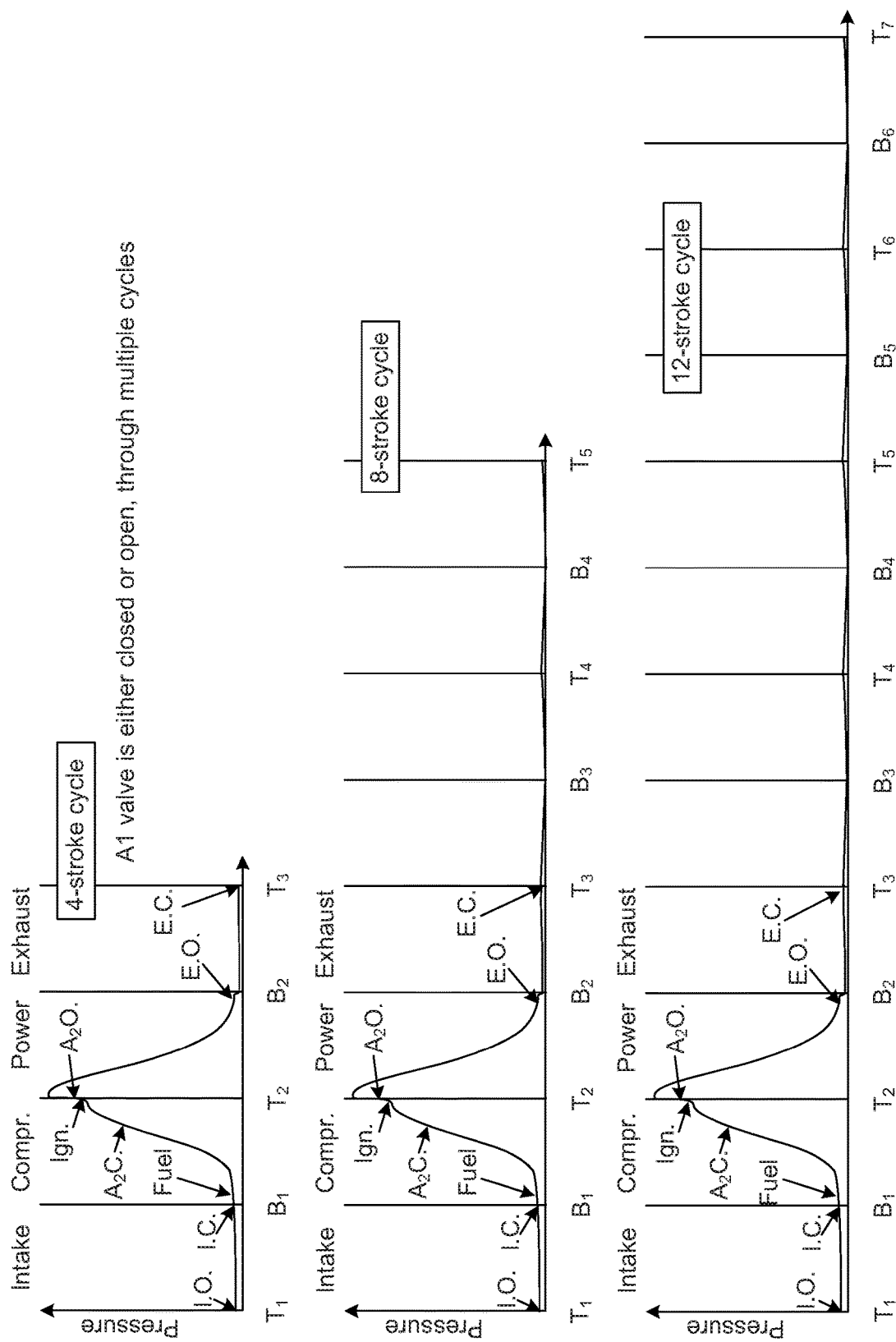
FIG. 10 illustrates 4-stroke, 8-stroke and 12-stroke cycles of operation of an alternate embodiment.

Referring to FIG. 10, 4-stroke, 8-stroke and 12-stroke cycles of an alternate embodiment may be seen. The 4-stroke cycle may be the same as the 4-stroke cycle of FIG. 9. However for the inactive cycles the exhaust valve 22 is closed at the end of the exhaust cycle (top dead center position T3) and remains closed until the end of the next power stroke. As such, the pressure in the combustion chamber 38 at the top dead center position T3 when the exhaust valve 22 is closed will be only slightly above atmospheric pressure, with the further strokes first decreasing that pressure then increasing the pressure back to approximately atmospheric pressure and repeating such strokes until the last top dead center position (T5 or T7) which corresponds to the first top dead center position T1 of the next cycle. Obviously if desired, 6-stroke and 10-stroke operation or operation with any other even number of strokes may be used, as desired.

The advantage of using air valve 26 to couple and decouple volume 44 from the combustion chamber 38 is that it allows a sudden increase in the combustion chamber volume and decrease in the combustion chamber pressure, and thus a decrease in the combustion chamber pressure and temperature spike, to allow operation of the engine at a maximum power setting, i.e., allowing fuel/air ratios to approach the stoichiometric fuel/air ratios without $NO_X$ generation. For operation under other power settings, one would need to evaluate the overall engine efficiency under various power settings to determine at each power setting whether operating on a 4-stroke cycle using the equivalent of a very lean fuel/air ratio would be most efficient or whether using a higher fuel/air ratio with a 6, 8, 10 or 12-stroke cycle would be more efficient.

Figure 11:
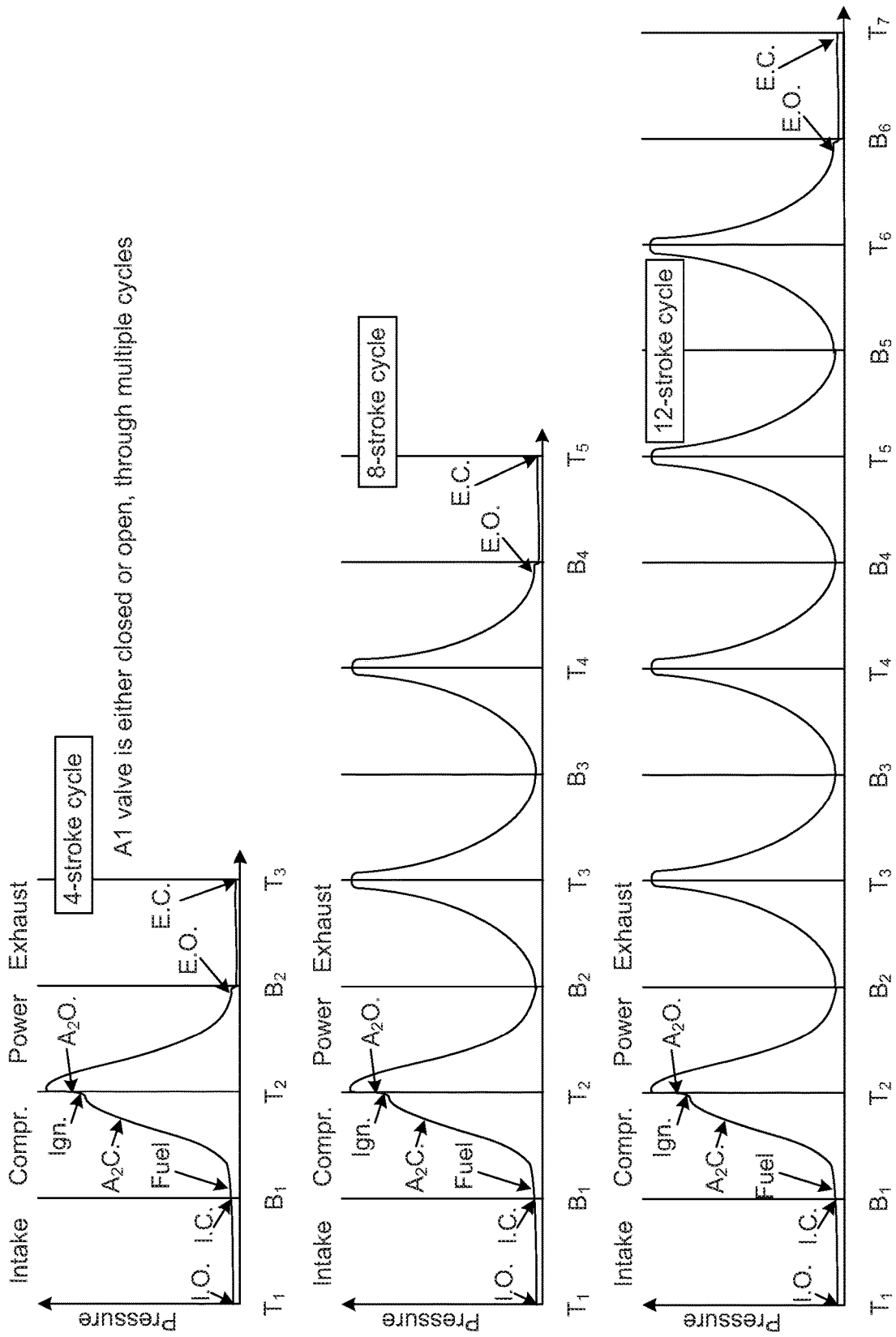
FIG. 11 illustrates further alternate cycles of operation of the present invention.

Now referring to FIG. 11, further alternate cycles may be seen. The 4-stroke cycle shown in FIG. 11 is also identical to the 4-stroke cycle of FIGS. 9 and 10. In the 8-stroke and 12-stroke cycles, however, after the power stroke at the bottom dead center position B2, the exhaust valve 22 is not opened, and accordingly additional compression and expansion strokes occur until after the last expansion stroke (B4 for the 8-stroke cycle and B6 for the 12-stroke cycle). The exhaust valve 22 is then opened (E.O.) and a normal exhaust stroke is executed, after which the exhaust valve 22 is closed (E.C.) for repeat of the entire cycle. As a still further alternate, the exhaust valve 22 could be opened at the bottom dead center position B2, after which the intake valve 20 could be opened at the top dead center T3 to take in cooler air, with the intake valve 20 being closed at the bottom dead center position B3, after which one or more compression and expansion strokes would occur before doing a final exhaust stroke (between B4 and T5 or between B6 and T7), with the cycle then repeating. Alternatively, the cycle need not repeat until the bottom dead center position B1 is reached, i.e., a second intake stroke is not used.

In all of these extra cycles, there will be some losses which will differ depending on which form of extra cycles is used. These losses are primarily friction losses, heat losses and flow losses. Friction losses probably do not vary that much with the differing extra cycles, though heat losses depend on the difference in temperature between the contents of the combustion chamber 38 and the walls of the combustion chamber. Accordingly, the extra cycles of FIGS. 9 and 10 are probably more efficient than the extra cycles of FIG. 11, though all should be evaluated, both for efficiency and convenience. By way of example, the extra cycles of FIG. 9, wherein the intake valve 20 and exhaust valve 22 are both left open during the extra cycles, may result in excessive flow losses and generate undesirable noise levels.

In the foregoing description, no particular function of volume 42 or of the operation of air valve 24 has been disclosed. This air valve 24, when open, increases the volume of the combustion chamber 38 and is intended to either be left open, having the effect of decreasing the inherent compression ratio, or being left closed, in effect increasing the compression ratio of that cylinder. Thus the compression ratio with air valve 24 closed can be made quite high, though reduced by operating the engine with air valve 24 open for fuels which are more easily compression ignited. Of course, in any event, one would control the valves, particularly the intake valve 20 with respect to the timing of its operation, to control the position of piston 40 when ignition occurs, with cycle to cycle corrections being made as required to maintain the ignition point at the desired piston position, ignition being sensed by pressure sensor 30. In that regard, the time of closing the air valve 24 will also have an effect on when ignition occurs, though it is preferable to dedicate the function of the air valve 24 to limiting the temperature spike and use the timing of the intake valve 20 to control the time of ignition.

Further, of course, one may not want to open the air valve 26 immediately when ignition occurs, as it is possible that doing so may drop the temperature in the combustion chamber so that combustion does not continue. Consequently it may be desirable to impose a short delay before opening the valve 26 to avoid such an occurrence.

Thus in the embodiments disclosed so far, air valve 24 in essence controls the static compression ratio of that cylinder of the engine, whereas air valve 26 controls (limits) the pressure and temperature spike that is obtained after ignition of a full fuel charge during high energy output by dynamically varying the compression ratio. Obviously either air valve 24 or 26 could be used for either purpose, and of course for some lower power settings of the engine, air valves 24 and 26 may both be left in fixed positions (open or closed) when the fuel/air ratio is too low to create pressure and temperature spikes that will generate $NO_X$. In addition, if volumes 42 and 44 are equal, one can alternate the functions of the air valves 24 and 26 and respective volumes 42 and 44 to help prevent excessive temperatures of the air valves 24 and 26. Alternatively, the volumes 42 and 44 may be purposely made unequal, which provides greater flexibility in the ability to control compression ratios of that cylinder, as either air valve 24 or 26 or both may be used for static or dynamic compression ratio control. This together with the electro-hydraulic control of the air valves 24 and 26 as well as the intake valve 20 and exhaust valve 22 provides a high degree of flexibility in the operation of an engine to ensure the most efficient operation and a maximum possible peak power output without generating $NO_X$. Both static and dynamic compression ratios are controllable, the time of compression ignition is controllable, primarily by control of the time of the closing of the intake valve 20, and the degree of suppression of the pressure and temperature spike is also controllable as required by the power setting, primarily by choosing the volume 42 and/or 44 of the auxiliary combustion chambers and by controlling the time of closure of the respective air valve(s) 24 and 26 to control the pressure difference between the volume of combustion chamber 38 and the respective auxiliary combustion chamber volumes 42 and/or 44.

One other aspect of the present invention is its flexibility in incorporation in both new and existing engines. In particular, substantially all engines currently on the road use two intake valves and two exhaust valves per cylinder, thereby providing the four valves needed with the present invention. Further, as shown in FIG. 8, the auxiliary combustion chamber volumes 42 and 44 are preferably defined by inserts 54 and 56, which may be incorporated into existing head designs with minor modification, either in the head design for new engines or by way of reworking or modifying the heads in preexisting engines. In that regard, the valve actuation system can be easily provided as a bolt-on system to existing heads or head designs so that any rocker arm assembly, push rods, etc. may be removed from the engine. The camshaft itself may be left in existing engines, if desired, as the existing head or heads may be swapped out for already reworked heads or themselves reworked or modified in accordance with the present invention without taking the engine out of the vehicle as may be required for removal of the engine camshaft. Removal of the camshaft is not necessary as the rotation of the camshaft without any load thereon takes a negligible amount of power. Thus the present invention may be operated in what is commonly referred to as an HCCI (homogeneous charge compression ignition) mode, known for its lack of carbon emissions, and controlled in accordance with the present invention at high power outputs as required to prevent any formation of $NO_X$.

In the disclosure above and in the claims to follow, references are made to top dead center positions and bottom dead center positions, which of course refer to the piston positions in the respective cylinder. However it is to be understood that these piston positions when being used to reference valve operation or ignition in the disclosure and the claims to follow are approximate only, and are to be interpreted as meaning at or near the respective piston position, irrespective of whether indicated as being at or near.

Figure 12:
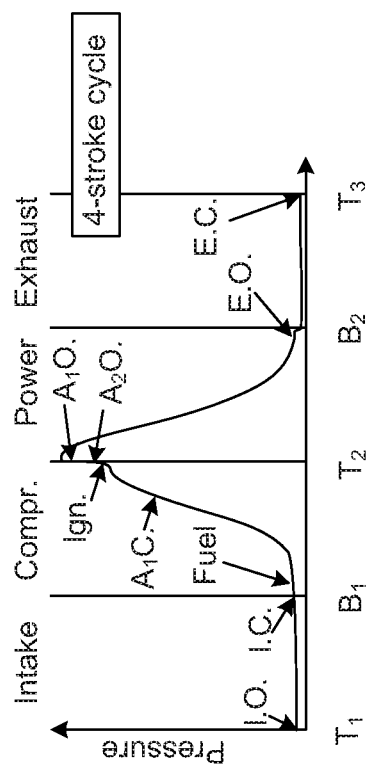
FIG. 12 illustrates an alternate 4-stroke cycle for the present invention.

FIG. 12 represents an alternate approach which decouples the control of the start of ignition from the start of the spike suppression function. The timing of the closing of air valve 24 ($A_1C$) controls the start of ignition and the opening of air valve 26 ($A_2O$) or both air valve 24 ($A_1C$) and air valve 26 ($A_2O$) controls the start of the suppression event. Note that the timing of the opening of air valve 26 ($A_2O$) is not identified in FIG. 12, as the same may be closed at any time from near the end of the power stroke to trap some exhaust gas to preferably before the beginning of the compression stroke. Note also, that the air chambers of FIG. 8 are of different size, though this is not a limitation of the invention. If they are of different sizes, which will be for ignition timing and which for spike suppression may depend on the characteristics of the fuel being used, mainly the ease with which it compression ignites and the energy content of the fuel. This approach greatly improves the dynamic control of the combustion process. This 4-stroke cycle may be used in any of the embodiments described with respect FIGS. 9, 10 and 11, and like those embodiments, are merely exemplary of the flexibility provided by two controllable volumes in a camless engine design. Such combustion cylinder volume control can be used with other embodiments also if incorporated into such engines.

Figure 13:
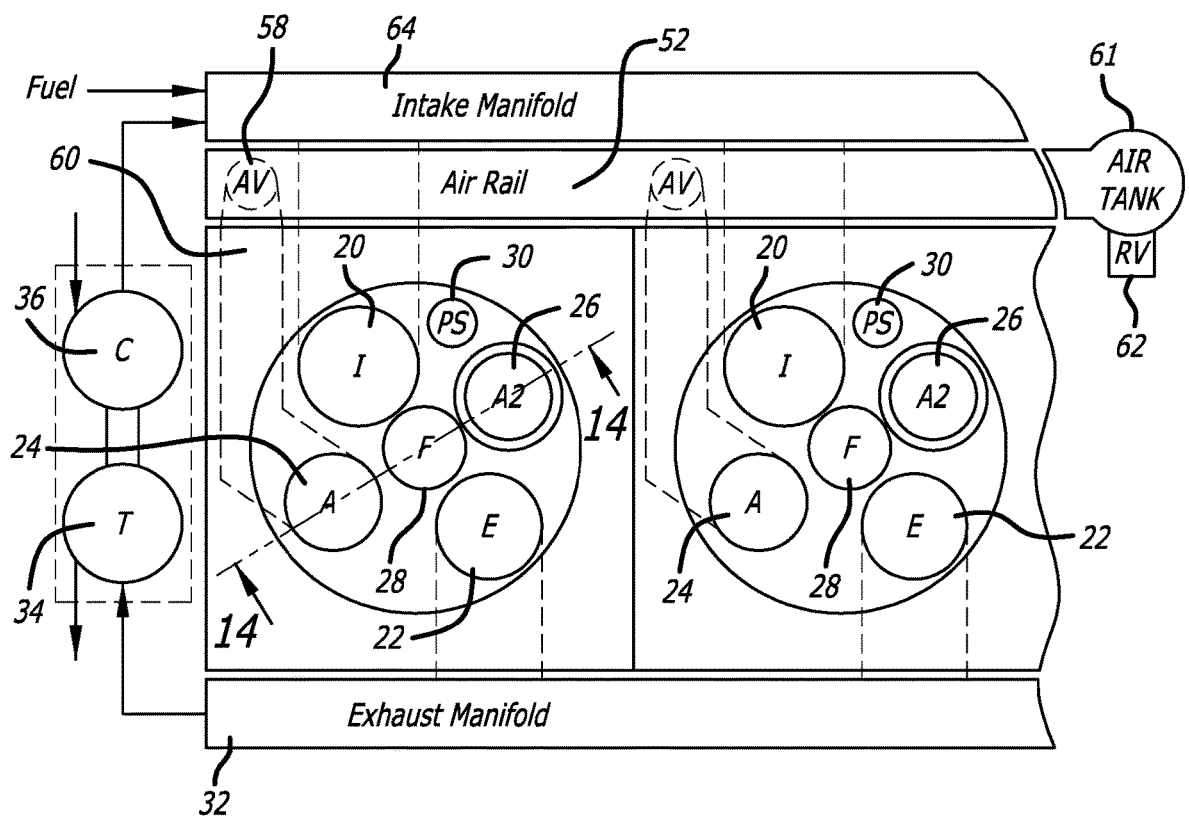
FIG. 13 schematically illustrates an exemplary engine head in accordance with one embodiment of the present invention.

Now referring to FIG. 13, an engine head in accordance with an alternate embodiment may be seen. This embodiment includes intake valves 20, exhaust valves 22, air valves 24 and 26, fuel injectors 28, and pressure sensors 30, as well as intake manifold 64, exhaust manifold 32, exhaust driven turbine 34 and compressor 36 of FIG. 6. In addition, however, an air rail 52 coupled to air tank 61 is added. Also in this embodiment, each air valve 24 is coupled to the air rail 52 through a respective auxiliary valve 58.

A cross section of this head through the air valves 24 and 26 as shown in FIG. 8 is identical with respect to the injector 28, injector control valve 50 and everything to the right of the injector 28 of FIG. 14. Similarly, the air valve 24, hydraulic actuator 46 and control valve 48 may be the same as that shown in FIG. 7. However, insert 54 need not be used, as the volume 42' together with the porting 60 (FIGS. 13 and 14) serve the same purpose. Of course, alternatively, such an insert 54 may be used or the equivalent of volumes 42 and 44 (FIG. 8) designed into new heads for existing engines. However in the case of retrofitting existing engines by reworking their existing heads, reworking the heads to include inserts 54 probably would not justify the cost of doing so, though in some cases, it may be necessary to actually decrease the preexisting available volume by some insert of some kind.

The embodiment of FIGS. 13 and 14 may be operated in various modes. By way of example, with the air valves 58 closed (FIG. 13), all cylinders may be operated in the same manner as hereinbefore described with respect to the embodiment of FIGS. 6-8. In a second mode of operation, used for both braking and energy storage, fuel may be shut off and air valve 26 and exhaust valve 22 left in the closed position, but with the intake valve 20 operated in the normal manner. Then at the end of a compression stroke, air valve 24 would be opened, delivering high pressure air to the air tank 61 for later use. (Alternatively the exhaust valve 22 could be opened to vent the high pressure in the combustion chamber 38 to the atmosphere.) On filling of the air tank, additional high pressure air may be vented to atmosphere through a pressure relief valve 62, or by opening the exhaust valve 22 at the top dead center position of the piston 40 as described above. Such operation is essentially a 2-stroke cycle operation, in that starting approximately at top dead center position of the piston 40 the intake valve 20 may be opened and an intake stroke bringing air into the combustion chamber is executed. Then when the following compression stroke causes the pressure in the combustion chamber 38 to somewhat exceed the pressure in the air tank, air valve 24 is opened to deliver the high pressure air to the air rail 52, and then closed at the top dead center position so that the intake valve 20 may be opened after the top dead center position to carry out another intake stroke for the following cycle.

Another mode of operation is to inject air into the combustion chamber 38 through air valves 24 and 58 from the air tank 61 at some point during the compression stroke. This can be used to increase the total amount of air in the combustion chamber 38, allowing the injection of a greater amount of liquid fuel through each injector 28, and for a longer period, so that the combustion occurs over a wider crankshaft angle to provide substantially increased power output of the engine. Obviously this will be limited by the size of the air tank, though can be quite beneficial for bursts of power when needed.

Another mode of operation is to operate one or more cylinders as compression cylinders using the intake valve 20 for the intake stroke and then opening air valve 24 and air valve 58 near the end of the compression stroke, if air valve 58 is not already open, to deliver high pressure air to the air tank, closing air valve 24 before the subsequent intake stroke begins. In this mode of operation, air valve 26 and exhaust valve 22 in the compression cylinders are not used. Other cylinders would be used as combustion cylinders with the high pressure air in the air tank 61 being injected into the respective combustion cylinders through air valves 24 and 58 reasonably late in the compression stroke and/or during the power stroke to allow longer injections of fuel and, again, maintain combustion and therefore high combustion chamber pressures over a wider range of crankshaft angle for more favorable energy conversion. Note that because all cylinders are the same, any one cylinder may be periodically alternated between use as a compression cylinder and use as a combustion cylinder to better distribute wear and engine heating for better functioning of the (preexisting) engine cooling system.

The foregoing modes of operation are exemplary only, and many other modes of operation are possible, including those of FIGS. 9-11 and any of the modes or adaptations of the modes disclosed in U.S. Pat. Nos. 6,415,749, 7,954,472, 7,958,864 and 7,793,638, and U.S. Patent Application Publication No. 2008/0264393.

Figure 15:
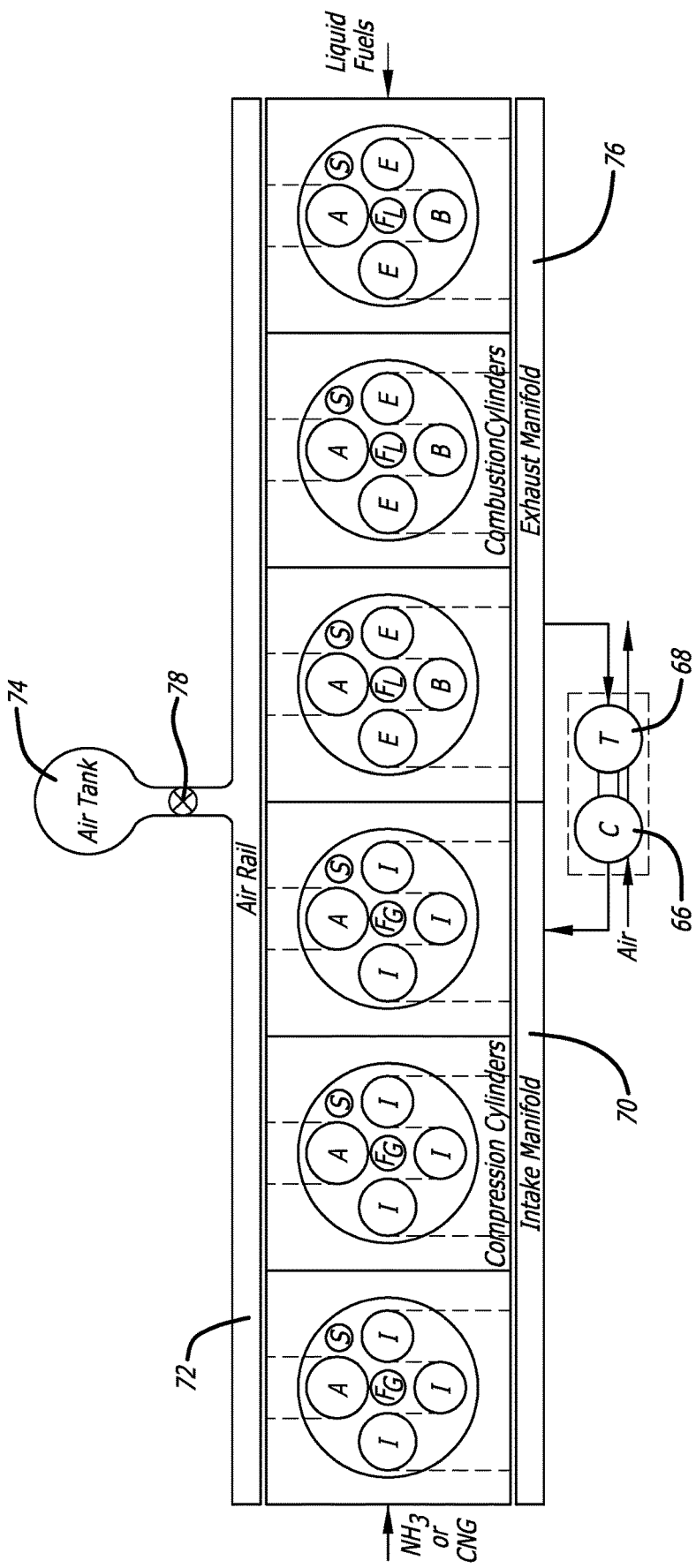
FIG. 15 schematically illustrates a further exemplary engine in accordance with another embodiment of the present invention.

Now referring to FIG. 15, a further embodiment of the present invention may be seen. Shown therein is a schematic diagram of a six cylinder engine with the left three cylinders being used as compression cylinders and the right three cylinders being used as combustion cylinders. As shown therein, a compressor or supercharger 66 is driven by the exhaust turbine 68 to deliver air to the intake manifold 70 at a temperature and pressure that are higher than atmospheric. Each of the cylinders, both compression and combustion cylinders, have four poppet valves, a fuel injector F and a pressure sensor S. For the compression cylinders, three of the poppet valves I are coupled to the intake manifold and used for ingesting air into the compression cylinders from the intake manifold 70 for compression therein. The fourth poppet valve A in each of the compression cylinders delivers air at a substantially further elevated pressure and temperature to the air rail 72, with an optional air tank 74 providing both a high pressure air storage capability and reducing pressure fluctuations in the air rail.

The pressure sensor S in the compression cylinders can be used to sense when the poppet valves A should be opened so that the desired pressure is maintained in the air rail. Alternatively, the valves A could be simple check valves which open when the pressure in a respective compression cylinder exceeds the pressure in the air rail 72 and otherwise remain closed. Except for the possible use of such a check valve, the poppet valve operation is preferably electronically controllable, such as by way of example, using a hydraulic valve actuation system such as that disclosed in the patents hereinbefore referred to. Thus the engine will be a camless engine with total freedom in the timing of actuation of the poppet valve, and further may also have an electronically controllable valve lift, if desired.

The fuel injectors $F_G$ shown in the compression cylinders are injectors for gaseous fuel such as compressed natural gas (CNG) and ammonia ($NH_3$), though other gaseous fuels could be used if desired. The gaseous fuel is injected into the compression cylinders during or before the compression stroke, and in fact could be injected during the intake stroke of the compression cylinder to assure the maximum possible mixing of the gaseous fuel and the air in or going into the compression cylinder. Thus if a gaseous fuel is being used, the air rail 72 will contain a gaseous fuel/air mixture less than or near the stoichiometric fuel/air mixture that is very well mixed prior to being passed to the combustion chambers.

The combustions chambers each include a poppet valve A for the intake of pressurized air or pressurized air/gaseous fuel mixture from the air rail 72 and two exhaust valves E for exhausting combustion products to the exhaust manifold 76. A fourth valve B may be in accordance with air valve 2 in FIG. 14, having a chamber such as bell shaped chamber 44 thereabove to provide the capability of a step change in the mechanical compression ratio of the combustion cylinders to limit the pressure and temperature spike that would otherwise be obtained for a near stoichiometric fuel/air ratio when operating with the HCCI combustion cycle.

Also, each combustion cylinder includes a liquid fuel injector $F_L$ for injection of a liquid fuel, such as by way of example, diesel fuel or biodiesel fuel, though other liquid fuels might also be used, including liquid fuels such as gasoline or substantially any other liquid fuel that releases enough energy on combustion to be useful in an engine. Such liquid fuels might also include, by way of example, ammonia ($NH_3$), dependent on whether the ammonia fuel normally stored in the liquid state under substantial pressure would be maintained in the liquid form at the temperatures required, as opposed to being reduced in pressure to turn into a gaseous state for injection in the compression cylinders as just described. Of course, as a further alternative, gaseous ammonia or any other gaseous fuel could be mixed with air in the intake manifold 70 without the use of a fuel injector $F_G$ in the compression cylinders. In that regard, even some liquid fuels such a gasoline could be mixed with air in the intake manifold 70 if desired.

In operation, using a liquid fuel such as diesel fuel, the valves in the compression cylinders may be operated so that on the intake stroke of a given cylinder the intake valves I are open. The intake valves I are then closed at the bottom of the intake stroke and the air in the respective cylinder is compressed during the compression stroke, with the valve A being opened when the pressure in the respective compression cylinder is equal to or slightly above the pressure in the air rail 72. Since the compression cylinders in the exemplary method of operation being described operate on a 2-stroke cycle, whereas the combustion cylinders operate on a 4-stroke cycle, there will be two compression cycles for each combustion cycle in each respective combustion cylinder.

For the combustion cycle, the exhaust valves E will be opened at the end of a combustion or power stroke, with the contents of the combustion cylinder being emptied into the exhaust manifold during the following exhaust stroke. Then at the top of the exhaust stroke, the exhaust valves E are closed and the air valve A is opened to pressurize the combustion cylinder to the pressure in the air rail 72 and air tank 74, if used. Then during the following stroke the cylinder is filled with air at the pressure of the air rail, which of course is substantially above atmospheric pressure. Accordingly, some power is recovered from the elevated air pressure in the combustion cylinder, though at the bottom dead center position the amount of air in the combustion cylinder will be approximately twice what would have been there with a conventional intake stroke, as each compression cylinder has undergone two compression strokes for each combustion cycle in the combustion cylinders. Of course associated with that higher pressure in the combustion cylinder is the higher temperature of the air therein resulting from its net compression in the compression cylinders. Preferably during that intake stroke of air from the air rail 72 through valve A, the liquid fuel is injected through the fuel injector $F_L$ in an amount dependent upon the power output demand of the engine. This assures excellent mixing of the liquid fuel with the air in the combustion chamber, in part because of the turbulence of the rush of air into the combustion cylinder and in part because of the elevated temperature in the combustion chamber converting the liquid fuel to a gaseous state, at least for most liquid fuels.

Then on the following compression stroke the charge in the combustion chamber, already at an elevated pressure and temperature, is further compressed by the compression stroke to achieve compression ignition at or near the top dead center position, followed by the combustion or power stroke, after which the exhaust valves E are opened to repeat the cycle.

For higher power settings where the fuel/air ratio is closer to the stoichiometric ratio, combustion chamber temperatures in the combustion cylinders would reach temperatures at which $NO_X$ is formed. Accordingly, for these power settings the valve B may be opened just after compression ignition occurs to provide an increase in the combustion chamber volume to reduce the pressure and temperature rise therein to maintain the combustion temperatures to a temperature below which $NO_X$ is formed. Thus the operation of the valve B is generally in accordance with the operation of the pilot valve 26 of FIG. 8 as hereinbefore described.

With respect to operation using a gaseous fuel, the fuel injectors $S_L$ in the combustion cylinders are not used, but rather the fuel/air ratio already provided in the air rail from the compression cylinders will be passed into the combustion cylinders through valve A for compression ignition on the next compression stroke. Otherwise, operation using a gaseous fuel will be as described with respect to the use of a liquid fuel, with the valve B being used if and when required to prevent the formation of $NO_X$.

When using a gaseous fuel, one might choose to not use the optional air tank 74, even if present, and close valve 78 for two reasons. First, the fuel/air ratio in air rail 72 would not be immediately controllable because of the fuel/air ratio in the contents of air tank 74. Also, if for some extraordinary reason a fuel/air mixture in the air tank 74 was ignited, the pressure capabilities of the air tank might be exceeded, with highly undesirable consequences. In that regard, the air rail, being of relatively small internal diameter and typically of a relatively thick wall, would itself probably not be harmed by such a backfiring. However, particularly when operating the engine on a liquid fuel, the air tank 74 may be used not only to smooth out pressure fluctuations in the air rail 72, but may also be used for energy storage, such as during use of the engine for braking purposes. Such stored energy could be used later to provide a burst of power when operating on a liquid fuel by substantially increasing the pressure in the combustion chamber prior to ignition, which of course would increase the total output power of the engine while that air at the extra pressure is being used. If the storage capability is high, the engine might actually be run on high pressure air for a short time. Alternatively the stored energy in the compressed air in the storage tank may be used to supply air at an elevated pressure to the air rail, thereby reducing the amount of air that the compression cylinders need to compress, thereby reducing the energy used by the compression cylinders As before, as may be seen from FIG. 15 and the description of operation of the engine schematically illustrated therein, the effective compression ratio in the combustion cylinders substantially exceed the mechanical compression ratio of the combustion cylinders, and in fact, can have an effective compression ratio approaching twice the mechanical compression ratio of the combustion cylinders, assuming the compression and combustion pistons diameters and strokes are equal. This allows the attainment of the high compression ratios and temperature required for compression ignition of a fuel like ammonia without mechanically requiring such a compression ratio in a single cylinder. Consequently, such an engine as schematically shown in FIG. 15 operates in an HCCI cycle because of the early injection of the fuel, not only of a gaseous fuel but of a liquid fuel also, when used by injecting that fuel not at the end of the respective compression stroke as in conventional compression ignition engines, but rather preferably early in the compression stroke, and even more preferably during the intake of air from the air rail 72, which provides maximum opportunity for uniform mixing and conversion of the liquid fuel to a gaseous form before ignition.

Figure 16:
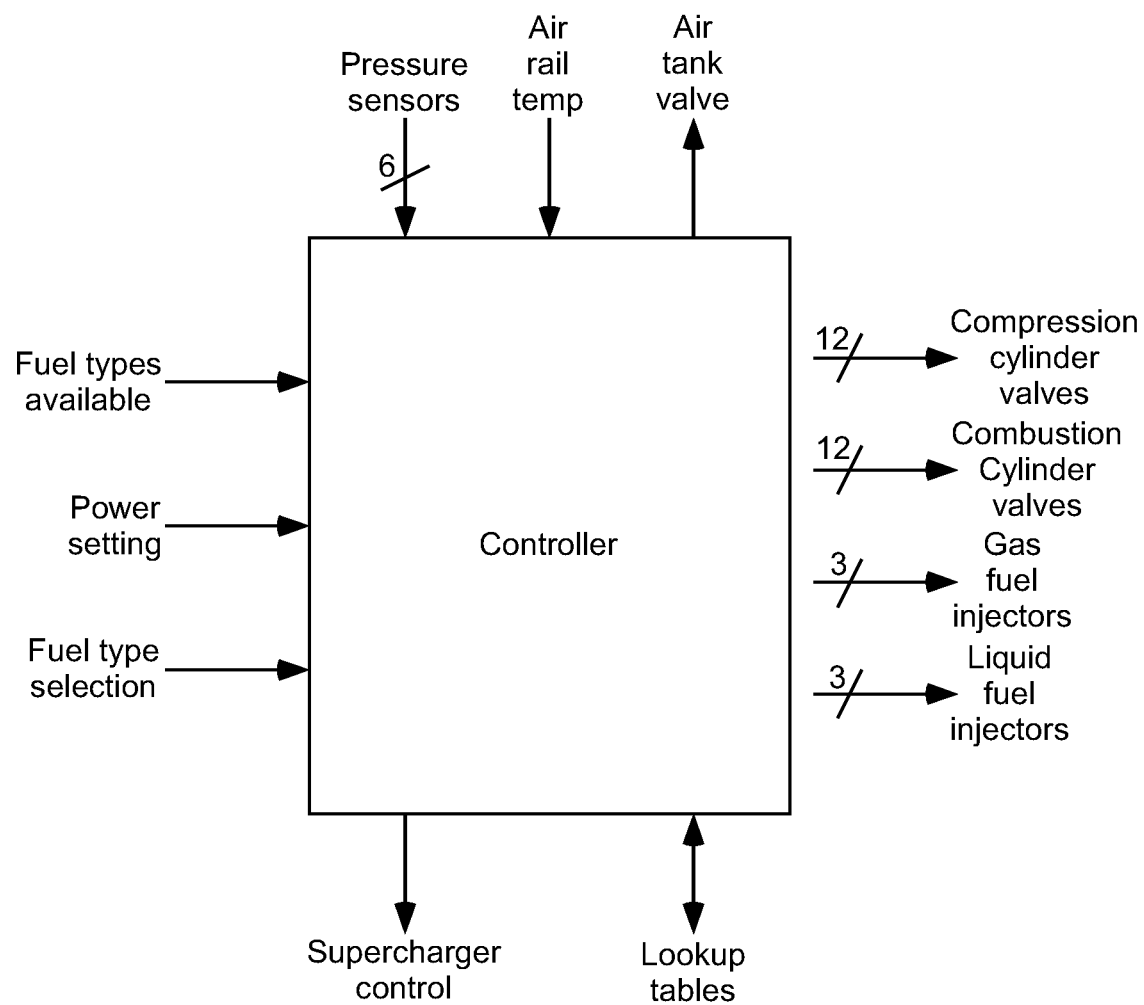
FIG. 16 illustrates an exemplary control system for the engine of FIG. 15.

In the foregoing description of the engine of FIG. 15, compression ignition at or near the top dead center piston position at the end of the compression stroke in a combustion cylinder was assumed without discussing how the same is obtained. In particular, since the fuel and air are essentially thoroughly premixed to form a homogeneous charge, the fuel/air mixture will go through compression ignition during compression when the temperature in the combustion chamber reaches the ignition temperature which, without control, may happen too early in the compression stroke or, alternatively, not happen at all. Accordingly, careful control of the compression ignition timing is essential to proper engine operation. This is facilitated in part by the electronic control of the compression cylinder valves and the combustion cylinder valves and in part by the manner in which they are controlled. In particular, an exemplary control system for the engine of FIG. 15 may be seen in FIG. 16. As shown therein, the controller is responsive to a power setting, such as by way of an accelerator in a vehicle, to an air rail temperature, and to the pressure sensors in the various cylinders to control the twelve compression cylinder valves, the twelve combustion cylinder valves, the three gas fuel injectors, the three liquid fuel injectors, the air tank valve and the supercharger based on these inputs. In an engine of the type being described, which will operate on both liquid and gaseous fuels, other inputs might include an input of the fuel type or types available and the fuel type selection. In particular, a vehicle may have two or more fuel tanks carrying different fuels, with the controller being provided with knowledge of what those two different fuels are and what fuel type has been selected for current operation of the engine. If two fuel types are available, the two types might be one liquid fuel and one gaseous fuel, though could be two different types of liquid fuels or two different types of gaseous fuels. The two different fuels might be, by way of example, a high energy content fuel and a low energy content fuel, with the engine switching back and forth between fuels dependent on the power setting. In that regard, because the controller would know the various valve operations required to obtain ignition at the desired time, such as by way of various lookup tables and sensed information such as the air rail temperature, switching back and forth between two different fuels, whether done regularly or infrequently, is a unique capability of the engines of the present invention.

The fuel types available might also be a low cost fuel capable of providing a limited vehicle range because of its limited storage energy density, such as by way of example, compressed natural gas, together with a second fuel that can be stored in liquid form for use when the vehicle range needs to be extended. Such a fuel might be conventional diesel fuel as a liquid fuel or a gaseous fuel which may be stored in liquid form, such as ammonia. Further, the two fuels might be selected based on other considerations such as based on availability at various destinations of the vehicle. The two fuels might also be selected based on their starting ease, such as the combination of a diesel fuel (perhaps even thinned with a percentage of gasoline) and ammonia. In such a combination the engine could be started on the diesel fuel using a conventional 4-stroke diesel cycle (injecting the diesel fuel into the combustion chamber at or near the top dead center position of the compression stroke) and then switching to HCCI operation when the engine warms up enough for that operation, and eventually to operation on the ammonia when allowed by the engine operating conditions.

In the control of the engine, the maximum effective compression ratio is obtained by using two full compression strokes in the compression cylinders for each combustion cycle in the combustion cylinders. Using a compression ratio in an individual cylinder of 20-25:1, the effective overall compression ratio is on the order of 40-50:1, more than enough to ignite even difficult to ignite fuels. The compression ratio may be reduced from that maximum by closing the intake valves I of the compression cylinders before a full compression chamber charge of air has been obtained. This, then, limits the amount of air being compressed, which in turn limits the pressure in air tank 74, if used, and further limits the initial compression of the air introduced into the combustion cylinders through the valve A. Thus the maximum pressure and temperatures achieved in the combustion cylinders on the compression stroke will be reduced from the maximum just described, which reduction may be reduced almost without limit to an average air rail pressure of even less than atmospheric, so that the effective compression ratio achieved in the combustion cylinders is actually less than the mechanical compression ratio of those cylinders. This controllability, together with the pressure sensors particularly in the combustion cylinders, allows sensing the timing of the initiation of combustion to allow the adjustment of the next combustion cycle. In that regard, while the amount of air being compressed in the compression cylinders may be fairly quickly reduced or increased, the pressure in the air rail 72 may lag, particularly if valve 78 is open so that air tank 74 is active. However for fine adjustment, the amount of air allowed into the combustion cylinders may itself be controlled by closing the valve A of the combustion cylinders slightly before the end of the intake stroke for the combustion cylinders to allow adjustment of that closing time, which in turn will provide an adjustment on the maximum compression temperature in the combustion cylinders for ignition (as compression ignition is temperature dependent, not pressure dependent). Thus short term adjustments may readily be made by control of the valves in the combustion cylinders to maintain compression ignition at the desired time, with longer term adjustments being made by control of the amount of air being compressed in the compression cylinders.

Figure 17:
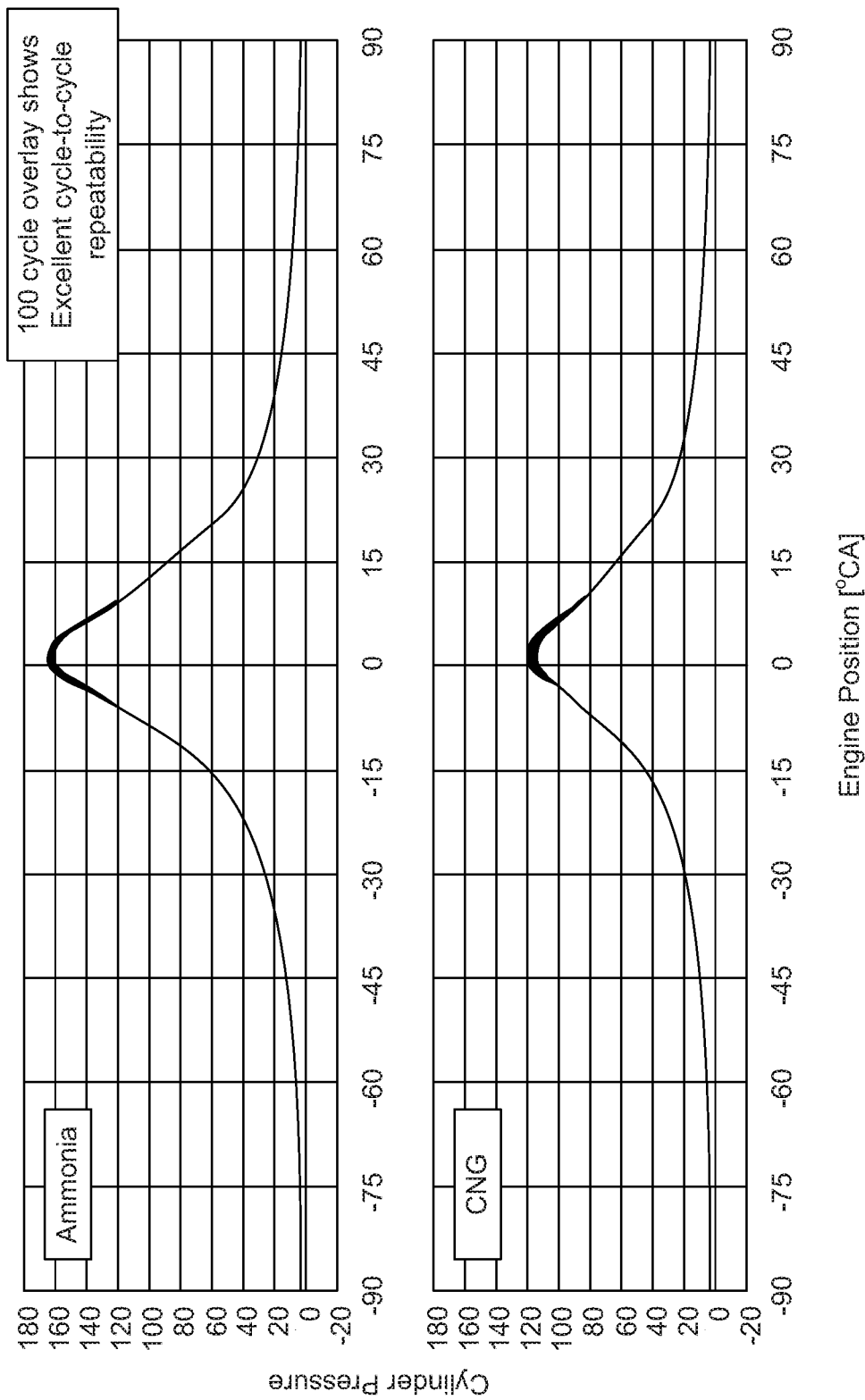
FIG. 17 illustrates the results, for both ammonia and gas, of a single cylinder engine operated in accordance with the present invention with hydraulic engine valve control using a source of heated high pressure air as a substitute for a compression cylinder.

As a confirmation of the inventions set forth herein, and the exceptional controllability of such engines by the electronic control of the fuel and engine valve operation, a single cylinder engine with the hydraulic engine valve control was operated using a source of heated high pressure air as a substitute for a compression cylinder. The results are shown in FIG. 17 for both ammonia and natural gas. The plots shown therein are 100 cycle overlays of the pressure profiles for the two different fuels in bar. Note that the pressure for compression ignition of ammonia was approximately 125 bar while the pressure for compression ignition of natural gas was approximately 80 bar. The repeatability of the pressure profiles is outstanding.

It was previously mentioned that in an engine system that has energy storage capabilities, such as an internal combustion engine with compressed air storage, a GPS system with a database of information regarding hills in roadways could be used to manage the operation of the energy storage system to maximize system efficiency and power when it is needed by determining when stored energy should be used or conserved as much as possible. By way of example, using the three dimensional sensing capabilities of GPS, if a downgrade is coming, the stored energy could be used before reaching the downgrade, and replenished when using the engine for braking on the downgrade. On the other hand if an upgrade is coming, the opposite may be the case. Either of these possibilities may be just around a curve, or even if visible, this is not something a driver can manage with accuracy and without tiring quickly. With a database of such information, however, the same may be automated, with the power setting set by the vehicle operator automatically being adjusted for the power required for energy storage and/or the power added from the stored energy, as the case may be.

If or until information on highway elevation versus position is available at a reasonable cost, one could simply use general elevation versus position as an approximation of the actual highway elevation versus position, if available. As a further alternative, one could use a self learning system by taking advantage of the fact that vehicle operators are creatures of habit. One takes the same route to the office every weekday, or at least one of perhaps two alternative routes which the system would quickly learn. On weekends, local or longer trips are frequently repeated, at least over a period of time. A self learning system would also learn that the operator almost always slows and gets off a freeway on the same downward directed off ramp to a downhill street, whereby the system would automatically save energy storage capability for storing the energy of slowing before and during the downgrade. Such a system not only would quickly learn the elevation versus position of the roads one normally travels, but would also learn how that driver uses those roads, which could be as beneficial or perhaps more beneficial that simply using road elevation versus position information. Such information might be parsed as weekday and weekend information, or broken down to day and time of day, or self adapting time breakdown dependent on the habits of the vehicle operator.

By way of example, if one approaches an upgrade that is followed by a steep upgrade, a simple database based system would save as much stored energy during the upgrade as possible for use for the steep upgrade. However a self learning system would know that the vehicle operator always stops for a while just before the steep upgrade and then turns around to go back. The self learning system would learn this pattern so as to not have significant stored energy when the base of the steep upgrade is reached, to have capacity for energy storage as the vehicle returns down the upgrade. Within limits, the greater the energy storage capability, the greater the efficiency gain a system could achieve. Certainly from a cost benefit viewpoint, GPS units are now relatively inexpensive, and in fact are being included in increasing numbers of new vehicles as part of current day navigation systems anyway. Also memory storage and computing power are current relatively inexpensive and are further increasing in capability and decreasing in cost as time goes on. Such a system can interface with the engine controller, so that the primary cost of implementation is the software development cost, which is a one-time cost.

So far, this aspect of the present invention has been described with respect to use with the present invention with high pressure air storage for the energy storage, though obviously other forms of propulsion and energy storage may be used as desired. By way of example, the present invention may be advantageously used with other energy storage facilities, such a battery storage, flywheel energy storage, etc. in hybrid powered vehicles. Actually, as stated before, generally the more energy storage provided, the more efficient such a system becomes, as its look-ahead capability simply increases.

In the foregoing description, a self learning system was described as an alternative to a database based system. Actually both may be used together, as each has certain unique capabilities the other does not, so that the combination of the two systems will be more efficient than either alone. Further, a self learning system may gather data which may be collected by users of the system and collectively put together to form the database for the database system. These are mere examples of what may be done, as there may be other GPS based techniques that may be used alone or in combination with these or other techniques to achieve the desired performance.

In the foregoing disclosure, reference was made to ammonia and natural gas as examples of fuels that may be used with embodiments of the invention. Note that these and other fuel may be used with other embodiments disclosed herein as applicable. In that regard, unless the context indicates otherwise, the words injection and injector when used in conjunction with fuels are used in the general sense to include introduction of fuel and device for the introduction of fuel generally.

Also, the invention illustrated in FIG. 8 and its method of operation may be used with all embodiments, which in general will allow use of near stoichiometric fuel/air ratios while still limiting the temperatures attained in the combustion chamber to less than temperatures at which $NO_X$ is formed.

Thus the present invention has a number of aspects, which aspects may be practiced alone or in various combinations or sub-combinations, as desired. While certain preferred embodiments of the present invention have been disclosed and described herein for purposes of illustration and not for purposes of limitation, it will be understood by those skilled in the art that various changes in form and detail may be made therein without departing from the spirit and scope of the invention as defined by the full breadth of the following claims.

What is claimed is:

1. A method of operating a compression ignition engine having at least one combustion cylinder and at least one compression cylinder, the method comprising:
   a) taking air into the compression cylinder during an intake stroke of the compression cylinder, compressing the air in the compression cylinder during a compression stroke and delivering the compressed air to an air rail; and
   b) coupling the air rail to the combustion cylinder at or near beginning of an intake stroke of the combustion cylinder, and decoupling the air rail from the combustion cylinder before a pressure in the combustion cylinder exceeds a pressure in the air rail.

2. The method of claim 1, further comprising:
   c) compressing the air in the combustion cylinder to obtain ignition of a fuel in the air in the combustion cylinder at or near the end of a compression stroke of the combustion cylinder;

d) executing a power stroke followed by another intake stroke in the combustion cylinder; and e) repeating a) through d).

3. The method of claim 2, further comprising: injecting a liquid fuel into the combustion cylinder during the intake stroke of the combustion cylinder of b) or at least early in the compression stroke of the combustion cylinder of c) to provide the fuel in the air in the combustion cylinder in c).

4. The method of claim 2, further comprising:

opening an engine valve to increase a volume of the combustion cylinder after the ignition and before the combustion cylinder reaches a temperature at which $NO_x$ is generated.

5. The method of claim 4, further comprising:

sensing compression ignition of fuel in the combustion cylinder and piston position when compression ignition occurs, and adjusting timing of operation of the engine valve, cycle to cycle, to maintain compression ignition at or near a top dead center position of the respective piston.

6. The method of claim 5, wherein adjusting the timing of operation of the engine valve comprises controlling the engine valve through an electronically controlled, hydraulically operated engine valve actuation system.

7. The method of claim 2, further comprising:

sensing compression ignition of fuel in the combustion cylinder and piston position when compression ignition occurs, and adjusting timing of operation of at least one engine valve, cycle to cycle, to maintain compression ignition at or near a top dead center position of the respective piston.

8. The method of claim 2, further comprising:

sensing compression ignition of fuel in the combustion cylinder and piston position when compression ignition cylinder occurs, and adjusting timing of operation of at least one engine valve in the compression cylinder, cycle to cycle, to maintain compression ignition at or near a top dead center position of the respective piston.

9. The method of claim 2, further comprising:

coupling an air tank to the air rail; and storing compressed air in the air tank when using the compression ignition engine as a brake.

10. The method of claim 2, wherein the fuel is ammonia or natural gas.

11. The method of claim 2, further comprising: storing energy in the compressed air in an air storage tank.

12. The method of claim 1, further comprising: injecting a gaseous fuel into an intake manifold that delivers the air into the compression cylinder in a) or into the compression cylinder during the intake stroke of the compression cylinder of a).

13. The method of claim 1, further comprising: supercharging the air in an intake manifold, wherein the air is taken into the compression cylinder from the intake manifold.

14. The method of claim 1, further comprising injecting fuel into an intake manifold that takes the air into the compression cylinder, or into the compression cylinder during the intake stroke of the compression cylinder.

15. The method of claim 1, wherein the at least one combustion cylinder and the at least one compression cylinder (i) all act as compression cylinders, (ii) all act as combustion cylinders, or (iii) each cylinder sometimes acts as a compression cylinder and sometimes acts as a combustion cylinder.

16. A method of operating a compression ignition engine comprising at least one compression cylinder and at least one combustion cylinder, the method comprising:

a) taking fuel and air into the compression cylinder during an intake stroke of the compression cylinder, compressing the fuel and air in the compression cylinder during a compression stroke of the compression cylinder, and delivering the compressed fuel and air to an air rail;

b) coupling the air rail to the combustion cylinder at or near the beginning of a compression stroke of the combustion cylinder and decoupling the air rail from the combustion cylinder before a pressure in the combustion cylinder exceeds a pressure in the air rail; and c) further compressing the fuel and air in the combustion cylinder to obtain ignition of fuel in the air in the combustion cylinder at or near the end of the compression stroke of the combustion cylinder.

17. The method of claim 16, further comprising:

d) executing a power stroke followed by an exhaust stroke in the combustion cylinder; and e) repeating a) through d).

18. The method of claim 17, further comprising: opening and then closing an exhaust valve during the intake stroke of the combustion cylinder to recirculate some exhaust gas.

19. The method of claim 17, further comprising: storing energy in the compressed air in an air storage tank.

20. The method of claim 17, further comprising: supercharging the intake air.

* * * * *